United States Patent
Bagabas et al.

(10) Patent No.: US 8,110,708 B2
(45) Date of Patent: Feb. 7, 2012

(54) SYNTHESIZING AND UTILIZING NOVEL RUTHENIUM NANOPARTICLE-ACTIVATED CHARCOAL-NANO-ZINC OXIDE COMPOSITE CATALYST

(75) Inventors: Abdulaziz A Bagabas, Riyadh (SA); Mohamed Mokhtar Mohamed Mostafa, Cairo (EG); Abdulrahman A Al-Rabiah, Riyadh (SA); Vagif Melik Akhmedov, Baku (AZ)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 0 days.

(21) Appl. No.: 13/095,417

(22) Filed: Apr. 27, 2011

(65) Prior Publication Data

US 2011/0197653 A1     Aug. 18, 2011

Related U.S. Application Data

(63) Continuation-in-part of application No. 13/091,089, filed on Apr. 20, 2011, now abandoned, which is a continuation of application No. 12/856,653, filed on Aug. 15, 2010, now Pat. No. 7,951,976.

(51) Int. Cl.
*C07C 45/72* (2006.01)
*C07C 27/00* (2006.01)
*B01J 23/06* (2006.01)
*B01J 23/60* (2006.01)

(52) U.S. Cl. ........ 568/388; 568/878; 502/307; 502/329; 502/343

(58) Field of Classification Search .................. 568/388, 568/878; 502/307, 329, 343
See application file for complete search history.

(56) References Cited

OTHER PUBLICATIONS

Burwell et. al. The Activated Adsorption of Hydrogen and Carbon Monoxide on Zinc Oxide. The Effect of Water Vapor, Effect of Water Vapor on Adsorptioonn Zinc Oxide, Sep. 1936, pp. 1753-1755.
H. S. Taylor, et. al., Studies of Methanol Catalysts. I, J. Am. Chem. Soc. 1927, 49, 2468-2476.
K. B. Wiberg, et. al., Thermochemical Studies of Carbonyl Compounds. 5. Enthalpies of Reduction of Carbonyl Groups, J. Am. Chem. Soc. 1991, 113, 3447-3450.
J. F. Woodman, et. al., The Hydrogenation of Ethylene at Surfaces of Certain Oxides. I. Zinc Oxide and Zinc Chromite, J. Am. Chem. Soc. 1940, 62, 1393-1396.
H. S. Taylor, et. al., The Heterogeneity of Catalyst Surfaces for Chemisorption. I. Zinc Oxide, J. Am. Chem. Soc. 1946, 69, 1306-1312.

*Primary Examiner* — Sikarl Witherspoon
(74) *Attorney, Agent, or Firm* — Geeta Kadambi; Riddhi IP LLC

(57) ABSTRACT

Ruthenium/activated charcoal (Ru/AC) treated with synthesized nano-ZnO (n-ZnO) is used for the first time as a novel composite catalyst in one-step self-condensation of acetone (DMK) to methyl isobutyl ketone in the gas phase. The DMK self-condensation was performed under atmospheric pressure, in a tubular glass fixed-bed microreactor, under DMK and $H_2$ continuous flow at temperature in the range of 523 to 648 K. Addition of n-ZnO to Ru/AC resulted in a pronounced increase in the degree of dispersion of Ru and in the acidic/basic sites concentration ratio. For the one-step synthesis of MIBK at 623 K, the composite catalyst with 2.5 wt % Ru loading was an active and selective bi-functional composite catalyst with balanced acid/base and hydrogenation properties. At 523 K, isopropyl alcohol, product of DMK-direct hydrogenation, was produced in high selectivity for instantly investigated composite catalyst. The catalytic performance depended on the composite catalyst identity, DMK flow rate, $H_2$ flow rate, and reaction temperature.

20 Claims, 22 Drawing Sheets

SYNTHESIZING AND UTILIZING NOVEL RUTHENIUM NANOPARTICLE-ACTIVATED CHARCOAL-NANO-ZINC OXIDE COMPOSITE CATALYST

CROSS REFERENCE TO RELATED APPLICATION

This application is a continuation-in-part application and claims priority to U.S. patent application Ser. No. 13/091,089 filed on 20 Apr. 2011, which is a continuation of U.S. patent application Ser. No. 12/856,653 filed on Aug. 15, 2010 now an issued patent application. The pending U.S. Application 13/091089 is hereby incorporated by reference in its entireties for all of its teachings.

FIELD OF TECHNOLOGY

This disclosure generally relates to synthesizing a ruthenium nanoparticle-activated charcoal-nano-zinc oxide composite catalyst and using the said novel composite catalyst to increase the production of methyl isobutyl ketone (MIBK) or isopropyl alcohol (IPA).

BACKGROUND

The conversion of low-price acetone (dimethyl ketone, DMK) by self-condensation process to high-value fine chemicals such as methyl isobutyl ketone (MIBK), diisobutyl ketone (DIBK), phorone (PH), and α-isophorone (IPH) is a challenge that is currently being faced by the industries.

MIBK is an important product derived from acetone. Methyl isobutyl ketone (MIBK), for instance, is a product widely used as a solvent in liquid-liquid extraction, vinyl, epoxy and acrylic resin production, dyes and nitrocellulose production. MIBK is also used as an extracting agent for antibiotic production or removal of paraffins from mineral oils, in the synthesis of rubber chemicals, and in fine chemistry applications. It is used as a solvent in paint and protective coating systems. MIBK is commercially produced using a three-step process. The main reaction pathways for the synthesis of MIBK from acetone are shown in FIG. 1. The first step is the aldol addition of acetone to diacetone alcohol (DA, 4-hydroxy-4-methyl-2-pentanone). The second step is the aldol condensation of DA to mesityl oxide (MO, 4-methyl-3-penten-2-one). The final step is the selective hydrogenation of the carbon-carbon olefinic bond of MO to form MIBK. The most commonly observed side reactions are over-condensation and unselective hydrogenations.

Numerous composite catalyst are currently used in gas or liquid phase production of MIBK to obtain high yield with little success. The production processes are complicated and operational costs are high. The use of homogeneous liquid base and acid composite catalyst create a corrosive environment, require an additional neutralization process for their disposal, and generate a significant wastewater stream. Furthermore, the separation of DA and MO is mandatory for carrying out its successive step. Thus, there is a need for a better composite catalyst, which may be used in gas-phase production as well as in liquid phase production of MIBK. The MIBK production should provide a higher yield and, in turn, should become cost effective.

SUMMARY

The invention discloses a composition, a method of synthesizing a ruthenium nanoparticle-activated charcoal-nano-zinc oxide (n-Ru/AC/n-ZnO) composite catalyst. The instant invention also discloses a process of producing MIBK and other by products via one-step, gas-phase DMK self-condensation process.

In one embodiment, method of synthesizing n-Ru/AC/n-ZnO composite catalyst is described. In another embodiment, a composition of n-Ru/AC/n-ZnO composite catalyst is described.

In one embodiment, influence of the acidic and basic properties of (n-Ru/AC/n-ZnO) composite catalyst on the activity and selectivity for DMK self-condensation to MIBK was evaluated. In another embodiment, n-ZnO was mixed with n-Ru/AC in different weight ratios.

In one embodiment, several hydrogen flow rates, DMK flow rates, temperatures were tested to optimize the performance of (n-Ru/AC/n-ZnO) composite catalyst. The composite catalyst in one embodiment is also described as a composite or a composite catalyst.

In another embodiment, characterizations of several properties of the novel (n-Ru/AC/n-ZnO) composite catalyst were performed. These characterizations were performed to prove the purity and efficacy of the novel composite catalyst and to prove the current methods efficiency and effectiveness.

In another embodiment, surface area variations were performed to test the efficacy of the composite catalyst. In another embodiment, Ru dispersion on the surface of the composite catalyst was performed to calculate the efficacy.

In one embodiment, acid base bi-functional properties were optimized for optimal efficacy of the composite catalyst.

In another embodiment, optimization of a gas phase process of highly selective conversion of DMK to MIBK using a (n-Ru/AC/n-ZnO) composite catalyst was performed. In another embodiment, optimization of a gas phase process of highly selective conversion of DMK to various by products using a (n-Ru/AC/n-ZnO) composite catalyst was performed.

The novel composite catalyst composition, method of synthesizing the novel composite catalyst and method of using the novel composite catalyst in chemical reactions, disclosed herein, may be implemented in any means for achieving various aspects. Other features will be apparent from the accompanying figures and from the detailed description that follows.

BRIEF DESCRIPTION OF THE DRAWINGS

Example embodiments are illustrated by way of example and no limitation in the tables and in the accompanying figures, like references indicate similar elements and in which.

Figure 1:
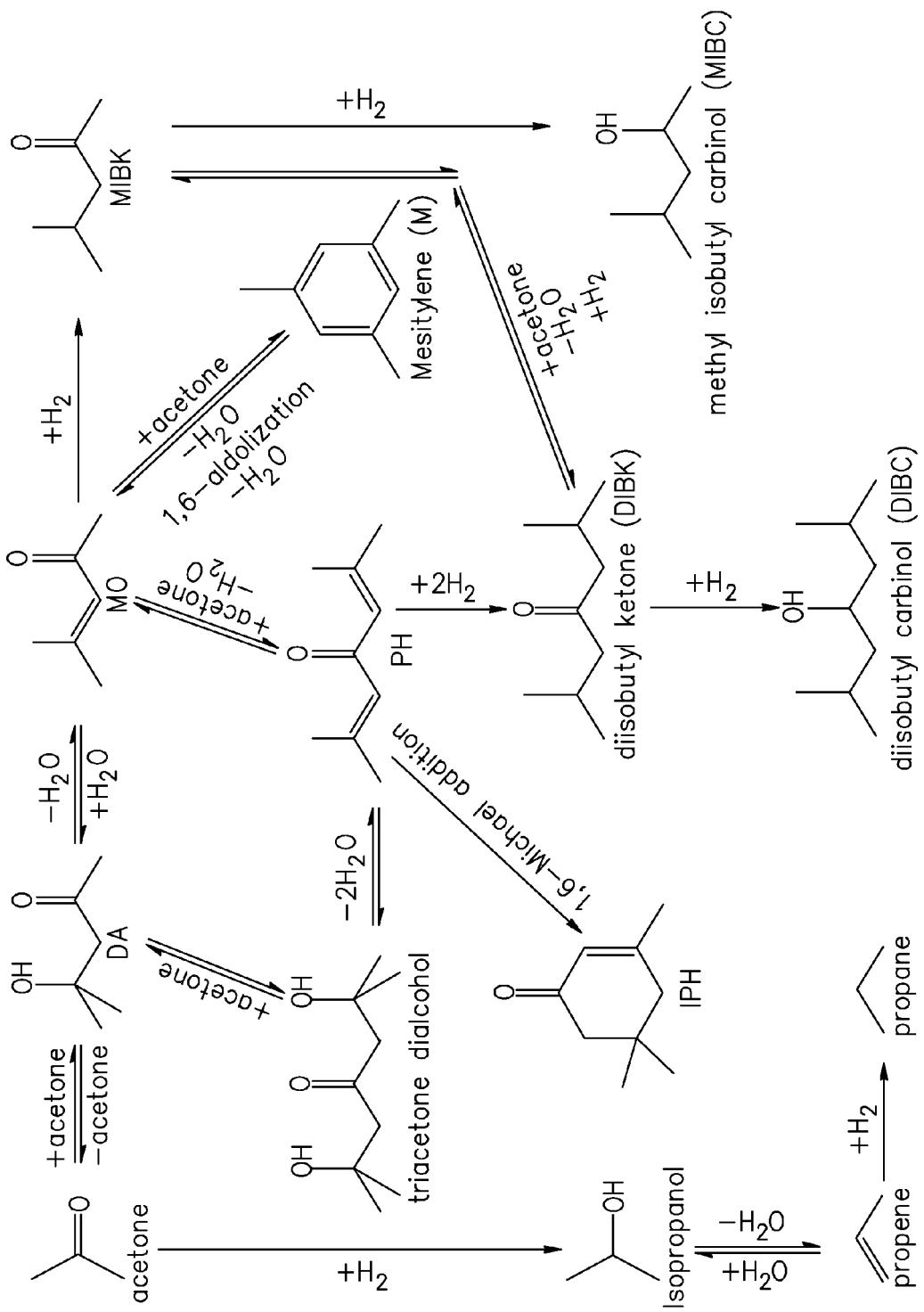
FIG. 1 main reaction pathways in acetone condensation process.

Other features of the present embodiments will be apparent from the accompanying figures, tables and from the detailed description that follows.

DETAILED DESCRIPTION

Several embodiments for a method, composition and process of synthesizing novel Ruthenium-activated charcoal-nano-ZnO (n-Ru/AC/n-ZnO) composite catalyst and using the novel composite catalyst to increase the production of MIBK and other by products are disclosed. Although the present embodiments have been described with reference to specific example embodiments, it will be evident that various modifications and changes may be made to these embodiments without departing from the broader spirit and scope of the various embodiments.

Preparation of (N-Ru/AC/n-ZnO) Composite Catalyst:

Materials—Acetone (Winlab HPLC grade, +99.8%), Hydrogen gas (99.999%), sodium pyruvate (Sigma-Aldrich, ≧99%), hydroxylamine hydrochloride (Carlo Erba, 99%), sodium hydrogen carbonate (Fluka, ≧99.5%), zinc sulfate heptahydrate (BDH, 99.5%), and ruthenium 5% on activated charcoal composite catalyst (n-Ru/AC, Winlab) were commercially available and were used without further purification.

Composition, Method of Synthesizing and Characterization of the Composite Catalyst Nano-ZnO (n-ZnO) was synthesized by adding an aqueous solution of sodium pyruvic acid oxime monohydrate [Na(PAO).H$_2$O] to the aqueous solution of ZnSO$_4$.7H$_2$O. A white precipitate of Zinc(II) 2-oximinopropionate dihydrate (Zn(PAO)$_2$(H$_2$O)$_2$) resulted upon mixing of the reactants. The precipitate was filtered off and then dried under vacuum overnight. Zn(PAO)$_2$(H$_2$O)$_2$ was heated overnight at 662 K in a muffle furnace to obtain n-ZnO. Mixing and pulverizing this oxide with n-Ru/AC with varied weight ratios (1n-Ru/AC:0n-ZnO, 1n-Ru/AC:1n-ZnO, 1n-Ru/AC:2n-ZnO, 3n-Ru/AC:2n-ZnO, and 0n-Ru/AC:1n-ZnO) to obtain (n-Ru/AC/n-ZnO) composite catalyst. The prepared composite catalyst was designated as 1Ru:0Zn, 1Ru:1Zn, 1Ru:2Zn, 3Ru:2Zn, and 0Ru:1Zn, respectively. The composite catalyst was activated in situ at 673 K under H$_2$ flow of 50-60 ml/min overnight prior to catalytic test.

The phase identification for the composite catalyst was performed on a Philips X'pert pro diffractometer, operated at 40 kV and 40 mA, using CuK$_\alpha$ radiation, in the 2 theta range from 2° to 100° in steps of 0.02° with a sampling time of one second/step. The crystallite size was calculated using Scherrer's equation:

$$D = B\lambda/(\beta_{1/2} \cos\theta) \quad (1)$$

where D is the average crystallite size of the phase under investigation, B is the Scherrer's constant (0.89), λ is the wavelength of the x-ray beam used (1.54056 Å), $\beta_{1/2}$ is the full width at half maximum (FWHM) of the analyzed diffraction peak and θ is the diffraction angle.

The BET-surface area of the prepared composite catalyst was estimated from N$_2$ physisorption at 77 K using a Quantachrome Autosorb-1-MP instrument.

The composite catalyst surface acidity and basicity were determined by temperature-programmed desorption (TPD) of pure ammonia (NH$_3$) and pure carbon dioxide (CO$_2$), respectively, using a TPD/R/O 1100 Thermo Electron instrument. For NH$_3$— or CO$_2$-TPD, a composite catalyst sample, weighing ~0.1 g, was pretreated in 10 ml/min helium (He) at 423 K for 2 h before NH$_3$ or CO$_2$ adsorption at 423 K with a flow rate of 10 ml/min for 30 min. Finally, the sample was flushed with He in order to remove the excess NH$_3$ or CO$_2$ gas. Adsorption/desorption was done under constant He flow of 25 ml/min to the temperature of 773 K with a ramp of 10K/min.

The metal surface area and dispersion were determined by H$_2$ pulse chemisorption at 343 K using a Micrometrics AutoChem 2910 instrument. An amount of 0.2-0.5 g composite catalyst was dried under vacuum at 393 K for 16 hours before starting the chemisorption process. Temperature-programmed reduction (TPR) of composite catalyst was performed by heating the samples from 298 K to 423 K at a heating rate of 5 K/min in 5% vol. $H_2$/Ar at gas flow rate of 10 ml/min. The sample was hold under these conditions at 423 K for 2 h, after which it was degassed for 2 h at the latter temperature. After the TPR process, the pulse chemisorption was started at 343 K. The metal surface area and dispersion were determined from the $H_2$ consumption.

Method of Using the Composite Catalyst

The DMK self-condensation was performed in a tubular glass fixed-bed micro-reactor (ID 0.9 cm), under ambient pressure of $H_2$ atmosphere. The reactor was placed in a vertical tubular furnace. A composite catalyst sample (~0.25 g) was loaded into the reactor between two layers of Pyrex glass wool and pieces of ceramics. A K-type thermocouple was placed in the center of the composite catalyst to monitor the reaction temperature. DMK was introduced to the reactor at a continuous flow, ranged between 0.01 and 0.025 ml/min, by a Hitachi HPLC pump (Model L-2100/2130), connected to a heated tube (338-343 K) for its delivery as a vapor mixed with a continuous $H_2$ flow, ranged between 5.0 and 20.0 ml/min, before entering the reaction zone at the top of the composite catalyst bed. The reaction liquid products were trapped at 233 K, were collected every one hour, and were analyzed off-line by using a Varian CP-3800 gas chromatograph, equipped with a flame ionization detector (FID) and a 50 m×0.32 mm×1.2 mm CP-Wax 58 CB column. The gaseous downstream flow was analyzed online by a refinery gas analyzer (RGA) Varian CP-3800 GC, equipped with an FID and a thermal conductivity detector (TCD). The products were identified by Gas Chromatography.

Physicochemical Characterization

Figure 2:
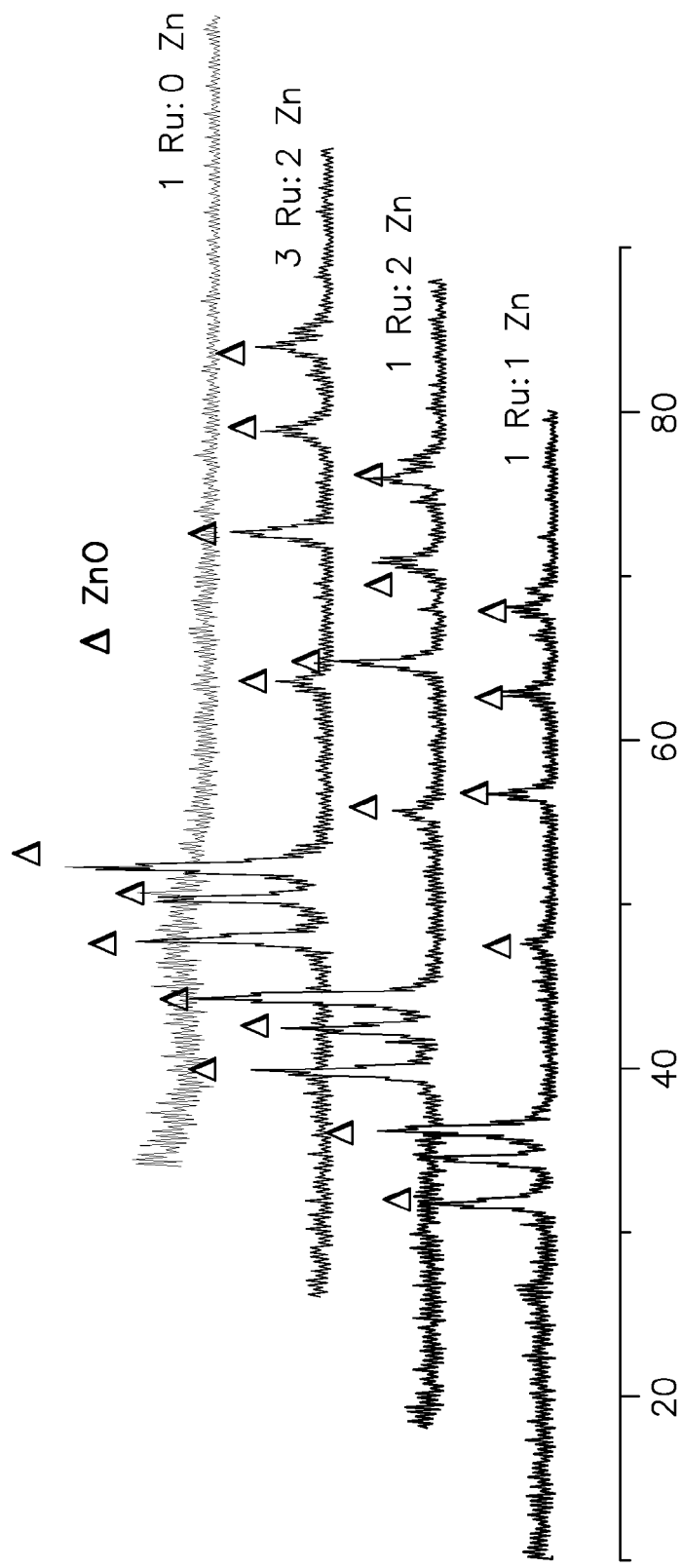
FIG. 2 XRD patterns of various investigated composite catalyst.

The crystalline phases as well as the crystallite size of the composite catalyst were determined form the XRD patterns, shown in FIG. 2. Amorphous structure was detected for 1Ru:0Zn sample while ZnO was the main crystalline phase for the remaining investigated solids. The calculations of the corresponding crystallite size are reported in Table 1. Moreover, a Ru crystalline phase was not detected, indicating the fine dispersion of Ru metal. The composite catalyst is nano-sized and the crystallite size for ZnO phase ranged between 21 and 29 nm.

the investigated composite catalyst are in the range of 315-386 $m^2$/g (for n-ZnO: 37.4 $m^2$/g). The textural properties of commercially available n-Ru/AC sample depend on the manufacturing process as well as the origin of the carbon. A heterogeneous mechanical mixing n-Ru/AC and n-ZnO effects the textural properties of the composite catalyst. Addition of n-ZnO to n-Ru/Ac leads to a change in the BET-surface area, which could be attributed to the heterogeneous mixing between n-Ru/AC and n-ZnO of different adsorption characters.

The Ru-metallic surface area ($S_{Ru}$) as well as its degree of dispersion over the mixed solid composite catalyst was determined using $H_2$ pulse chemisorption at 343 K. The results obtained are tabulated in Table 1. As shown in Table 1 the trend of both metallic surface area and the degree of dispersion of Ru metal behave similarly for all combinations of composite catalyst. The apparent maximum values of both metallic surface area and degree of dispersion were observed for the sample with 3 wt % Ru-loading (3Ru:2Zn). In one embodiment, the Ru loading in 1Ru:1Zn is only 2.5 wt. % and its degree of dispersion of about 5.29%, it is observed that the degree of dispersion of Ru on such composite catalyst was higher than that of 3Ru:2Zn composite catalyst. However, samples containing n-ZnO showed a higher $S_{Ru}$ and degree of dispersion compared to 1Ru:0Zn sample. The addition of n-ZnO to n-Ru/AC composite catalyst may be responsible for enhancing the degree of dispersion of ruthenium.

$CO_2$-TPD measurements were performed to obtain information on the number of active base sites in the prepared samples (Table 2). The amount of $CO_2$ adsorbed on 1Ru:0Zn and (n-Ru/AC/n-ZnO) composite catalyst was found in the range of 0.04-0.27 mmol/$g_{cat}$. The basic site density for 1Ru:0Zn and the sample contains a high Ru loading (3 wt %) show the same value ($0.07 \times 10^{-2}$ mmol/$m^2$). A pronounced decrease was observed in the basic site density values upon decreasing the Ru (wt %) loading, i.e. increasing in n-ZnO content, to attain the lowest value ($0.01 \times 10^{-2}$ mmol/$m^2$) at 1.67 Ru wt % loading.

TABLE 1

| Catalyst | XRD Phases | Crystallite Size (nm) | Ru-loading (Wt. %) | $S_{BET}$ ($m^2$/g) | $S_{Ru}$ ($m^2$/g) | Dispersion (%) |
|---|---|---|---|---|---|---|
| 1Ru:0Zn | amorphous | — | 5 | 327 | 22.43 | 4.61 |
| 1Ru:1Zn | zincite | 25 | 2.5 | 386 | 25.73 | 5.29 |
| 1Ru:2Zn | zincite | 29 | 1.67 | 315 | 24.36 | 5.00 |
| 3Ru:2Zn | zincite | 21 | 3 | 375 | 30.70 | 6.31 |

Figure 3:
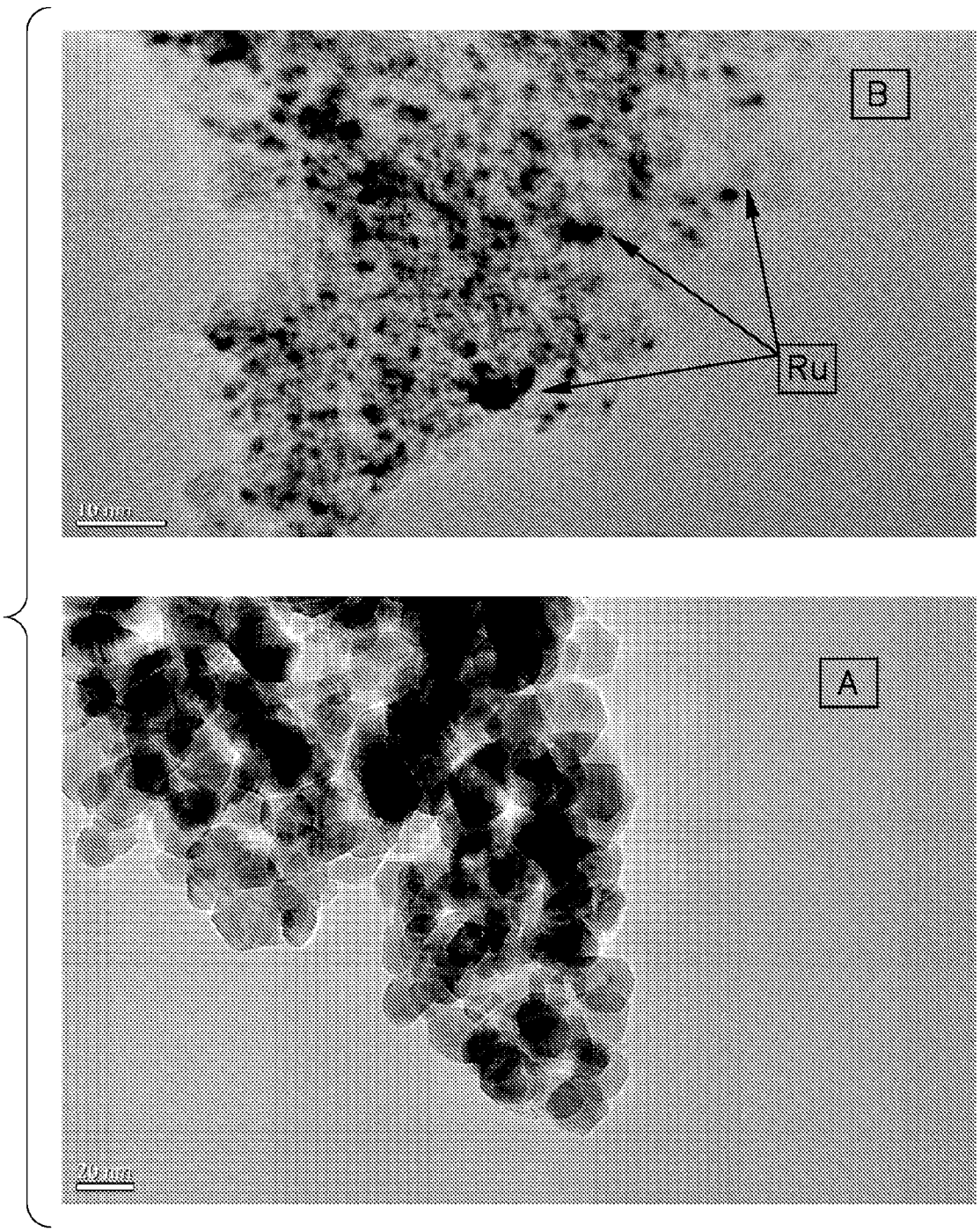
FIG. 3 TEM image of: [A] n-ZnO; [B] 5% n-Ru/AC composite catalyst.

To obtain more detailed information about the structure of the (n-Ru/AC/n-ZnO) composite catalyst, TEM analysis at various magnifications was performed (FIG. 3). Low-magnification TEM (20 nm) shows a specific hexagonal shaped ZnO crystallites in 20-29 nm in size (FIG. 3). On the other hand, high magnification TEM (10 nm) for n-Ru/AC samples (FIG. 3) shows an amorphous structure. The black spots appear on the surface of activated charcoal represents the dispersed Ru nanoparticle. These pictures complement the XRD investigation.

$S_{BET}$-surface areas, derived from the nitrogen adsorption and desorption isotherms of various investigated composite catalyst samples, are given in Table 1. The $S_{BET}$ values of all

TABLE 2

| Catalyst | $CO_2$ ads., mmol/g | $NH_3$ ads., mmol/g | Acidic/basic sites concentration after ZnO loading (%) |
|---|---|---|---|
| ZnO | 0.00 | 4.25 | — |
| 1Ru:0Zn | 0.21 | 0.39 | 1.86 |
| 1Ru:1Zn | 0.11 | 0.16 | 1.45 |
| 1Ru:2Zn | 0.04 | 0.28 | 7 |
| 3Ru:2Zn | 0.27 | 0.12 | 0.44 |

Estimation of the acidic sites was derived from $NH_3$-TPD measurements (Table 2). The variation in the number and distribution of the acid sites as a function of different n-ZnO content was estimated by $NH_3$-TPD. The amount of $NH_3$ adsorbed on 1Ru:0Zn and (n-Ru/AC/n-ZnO) composite catalyst were found in the range of 0.12-0.39 mmol/$g_{cat}$. Table 2 illustrates the percentage increase in acid sites concentrations after n-ZnO loading on Ru/AC composite catalyst. The acidic/basic site ratio for 1Ru:2Zn sample recorded the highest value (7%). The pronounced increase in the acid sites density is mainly attributed to the increased amount of n-ZnO powder, of high acidic site density ~4.25 mmol/gcat.

Catalytic Activity and Selectivity

Figure 4:
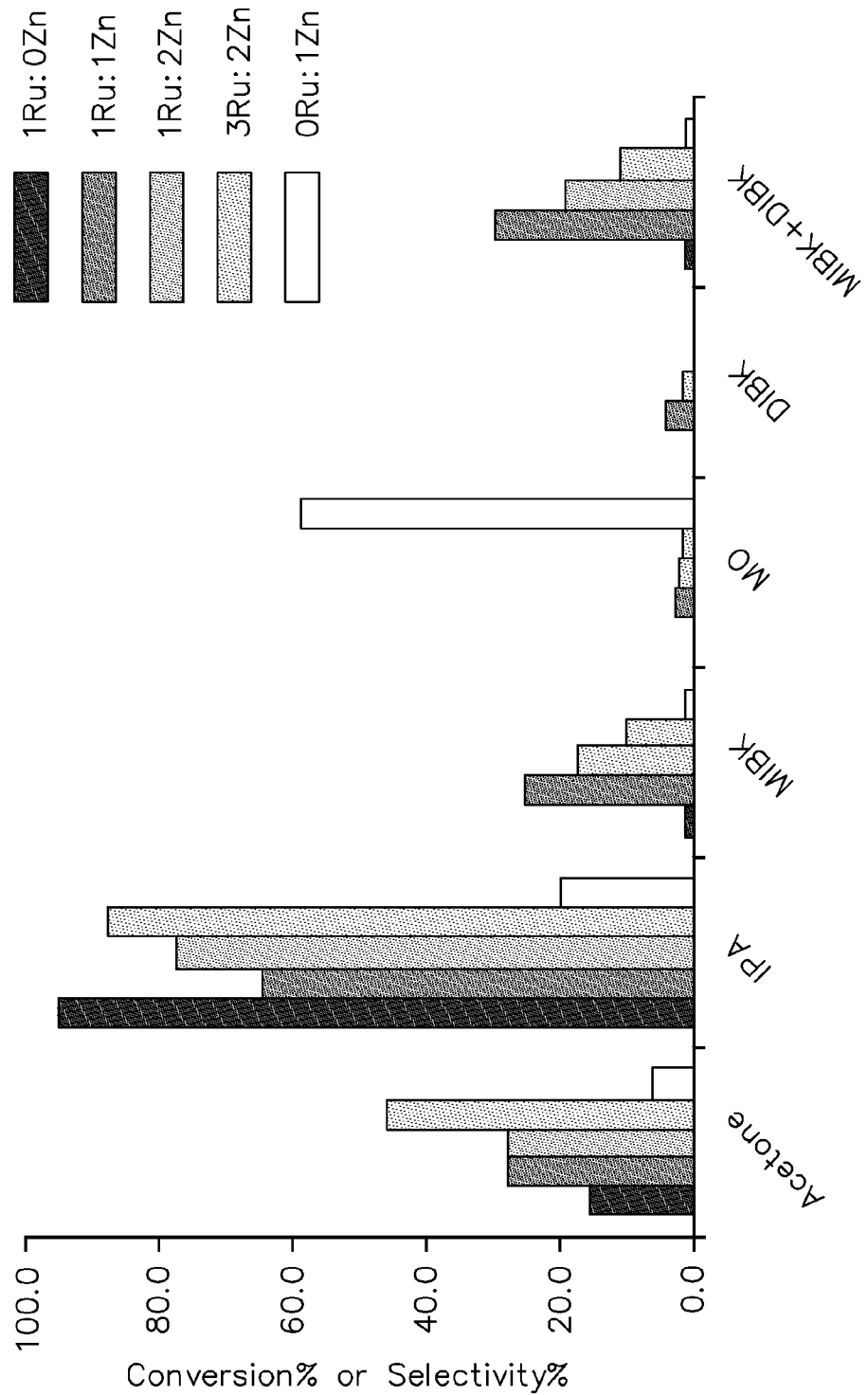
FIG. 4 Comparison between the composite catalyst in terms of DMK conversion % and product selectivity % [T=523 K; $H_2$=20 ml/min; DMK flow rate=0.01 ml/min, time-on-stream (TOS)=1 h].

FIG. 4 displays the selectivity % of MIBK as a function of the conversion % of DMK over the five (n-Ru/AC/n-ZnO) composite catalyst at 523K. Selectivity % values of the predominant by products, IPA, MO, and DIBK, were observed. In the gaseous phase, neglected amounts of propene and propane were also detected. Such observation implies that IPA undergoes a neglected dehydration process. In these experiments, the 3% Ru-loading composite catalyst (3Ru:2Zn) resulted in DMK conversion of 46%, a high selectivity towards IPA of 88%, and a low selectivity towards MIBK of 11%. This embodiment indicates that Ru-loading favors DMK-direct hydrogenation. 1Ru:0Zn composite catalyst showed the highest IPA selectivity, while 0Ru:1Zn resulted in the lowest IPA selectivity. These results compliments the results, obtained from $H_2$-chemisorption, and confirms the role of Ru to enhance the DMK-direct hydrogenation process on the expense of DMK self-condensation one. In one embodiment, the highest MIBK selectivity (~26%) was obtained by 1Ru:1Zn composite catalyst. These results may be evidence for the role of n-ZnO on the DMK self-condensation via dehydration process due to its specific acid-base properties.

Figure 5:
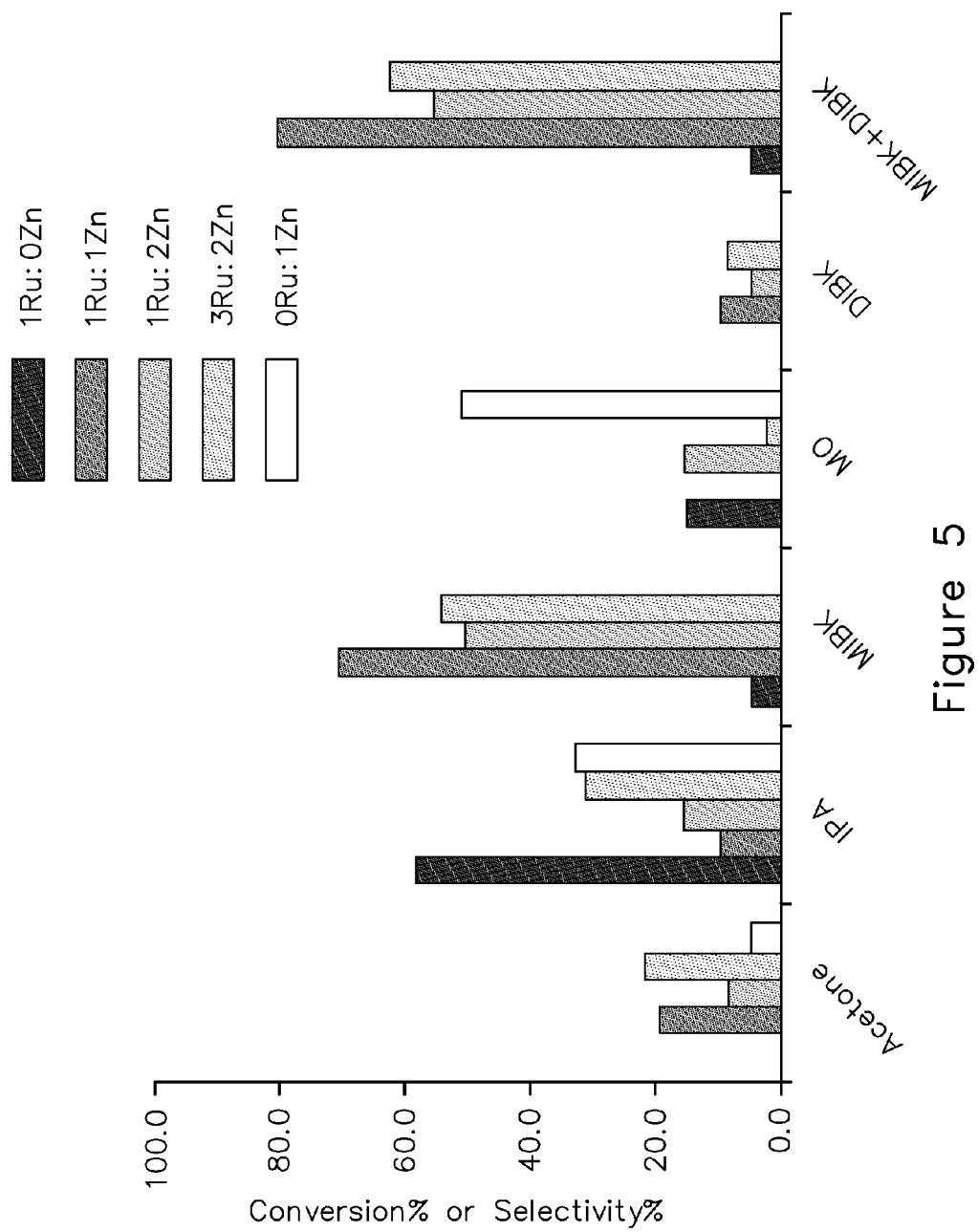
FIG. 5 Comparison between the composite catalyst in terms of DMK conversion % and product selectivity % (T=623 K; $H_2$=20 ml/min; DMK flow rate=0.015 ml/min, TOS=1 h).

Increasing the reaction temperature up to 623K (FIG. 5) resulted in a pronounced decrease in the conversion of DMK to attain 22% at the 3% Ru-loading (3Ru:2Zn) composite catalyst. However, increasing the temperature led to improve the selectivity of all the investigated composite catalyst towards the DMK self-condensation process over the DMK-direct hydrogenation. A maximum selectivity towards MIBK (~71%) was attained by using 1Ru:1Zn composite catalyst. Moreover, this particular composite catalyst showed balanced acidic/basic properties and relatively high degree of Ru-dispersion over all the investigated composite catalyst.

Figure 6:
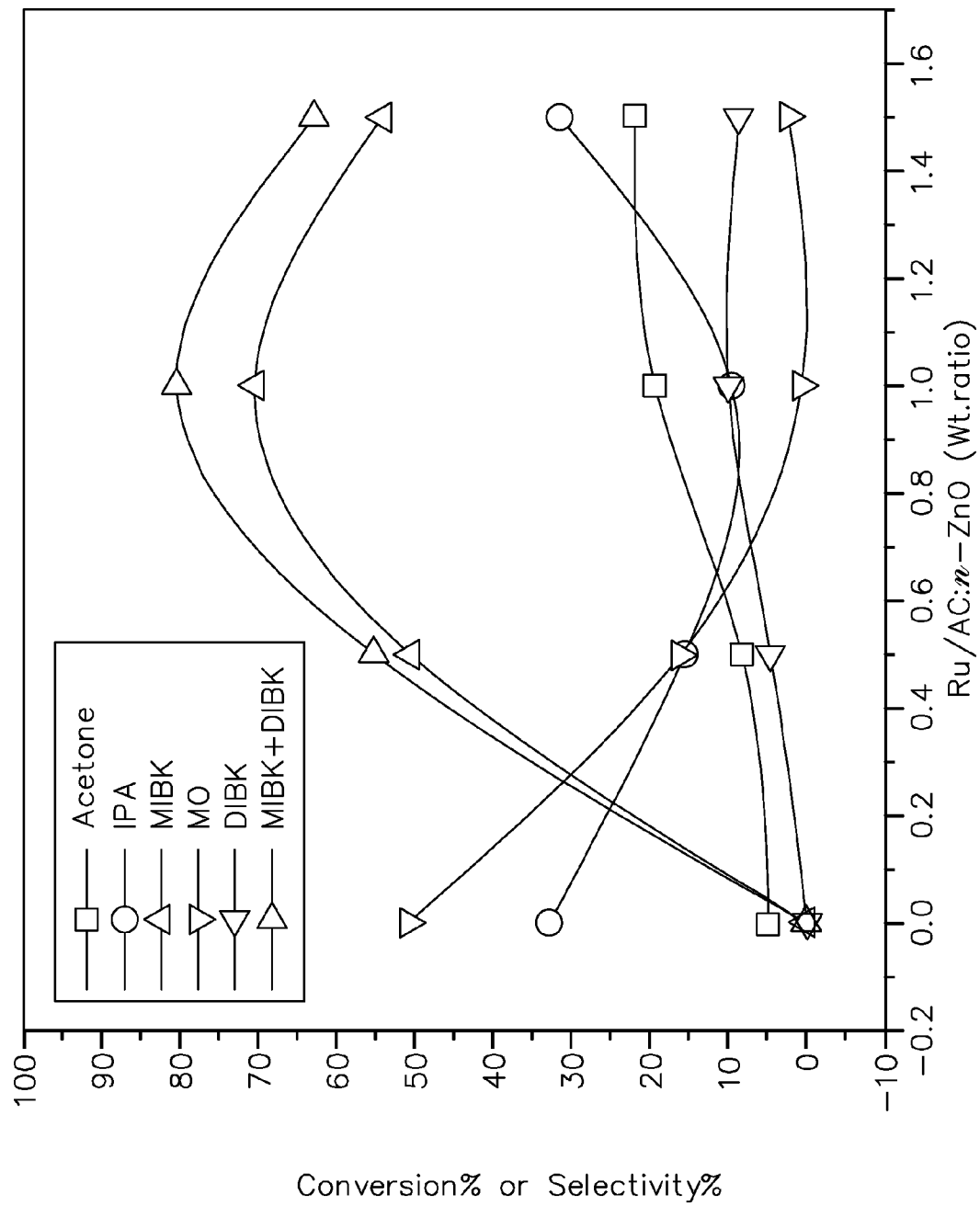
FIG. 6 Effect of n-Ru/AC:n-ZnO weight ratio on the DMK conversion % and product selectivity % (T=623 K; H$_2$=20 ml/min; DMK flow rate=0.01 ml/min, TOS=1 h).

The effect of (n-Ru/AC/n-ZnO) weight ratio on the catalytic performance of the instant composite catalyst at 623 K, a relation between this ratio, DMK conversion % and product selectivity % is illustrated in FIG. 6. The results indicate that the DMK conversion % increases upon increasing the Ru-content. The selectivity % towards MIBK follows a volcano-type curve with a maximum at 1n-Ru/AC:1n-ZnO.

Figure 7:
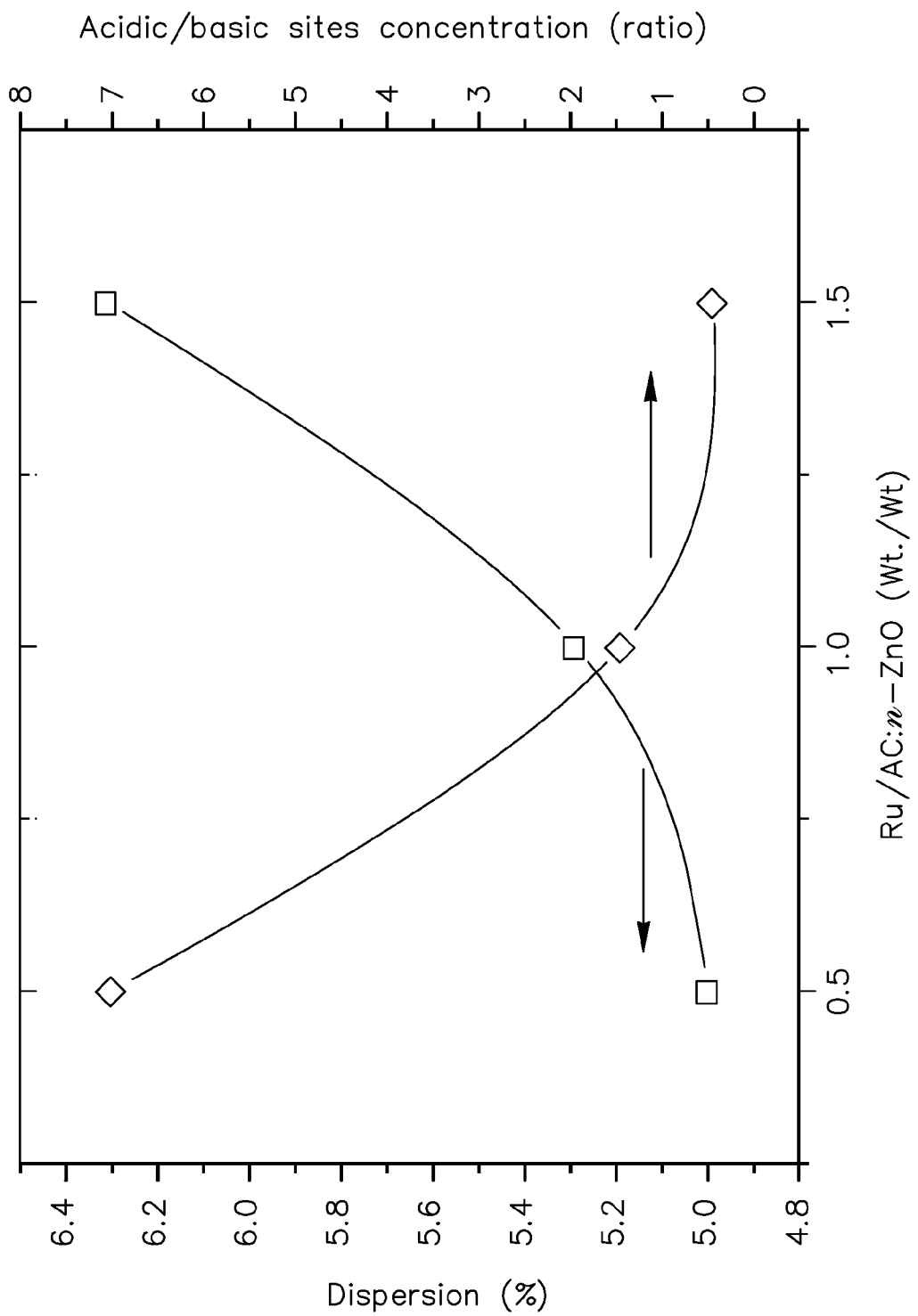
FIG. 7 The dependence of acidic/basic character and Ru-dispersion % on the weight ratio of composite catalyst identity.

FIG. 7 illustrates the results of the dependence of acidic/basic site concentration and Ru-dispersion % on the (n-Ru/AC/n-ZnO) weight ratio. The results, as shown in FIG. 7, indicate that the Ru-dispersion % increases monotonically while the acidic/basic sites concentration ratio decreases exponentially upon decreasing the n-ZnO content. These observations are in agreement with the observed dependence of the catalytic selectivity % towards MIBK at 623 K on the composite catalyst identity in the following order: 1Ru:1Zn>3Ru/2Zn>1Ru/2Zn>1Ru/0Zn>0Ru/Zn. This trend in MIBK selectivity % could be related to the effect of the surface acidic/basic nature and to the dispersion power of n-ZnO on the performance of the composite catalyst.

Condition for Composite Catalyst Performance

The influence of temperature, DMK flow rate, and $H_2$ flow rate on the catalytic activity of the composite catalyst was done by varying various parameters. The effect of temperature was explored by studying the reaction at 523, 573, 623, or 648 K. The effect of acetone flow rate was investigated at 0.01, 0.015, 0.02, or 0.025 ml/min while the $H_2$ flow rate was studied at 5.0, 10.0, 15.0, or 20.0 ml/min. Some representative examples, demonstrating the effect of each factor on the DMK conversion % and the selectivity % towards the main products at the first-hour time-on-stream (TOS), are given below.

Figure 8:
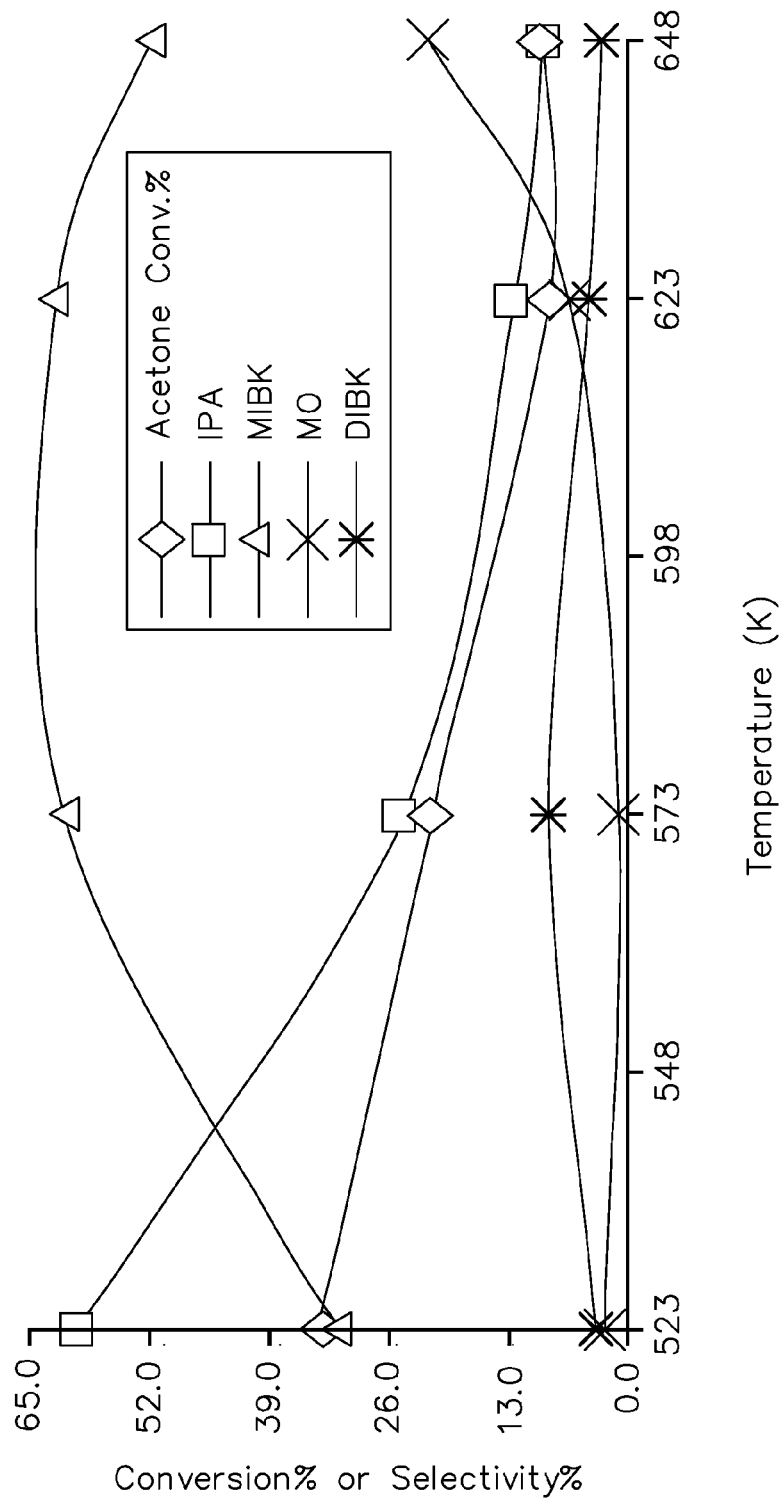
FIG. 8 Variation of DMK conversion % and product selectivity % with increasing the reaction temperature over 1Ru/2Zn composite catalyst (H$_2$=10 ml/min; DMK=0.01 ml/min; TOS=1 hr).

FIGS. 8-12 display how temperature, affects the catalytic behavior. FIG. 8 shows that DMK conversion % and selectivity towards IPA decrease upon increasing the temperature over the 1Ru/2Zn composite catalyst, at $H_2$ flow rate of 10 ml/min and DMK flow rate of 0.01 ml/min. On the other hand, the selectivity towards MIBK and towards DIBK increases with raising the temperature to 573 K, after which it decreases with increasing temperature. This decrease in MIBK and DIBK selectivity is accompanied with increase in MO selectivity. These trends in DMK conversion % and product selectivity % are evidence of the reduction of the composite catalyst activity with increasing temperature. However, 573 K may be regarded as the best temperature for the production of MIBK from DMK-self condensation process while 523 K is the best temperature for the production of IPA from the DMK-direct hydrogenation process by using the 1Ru/2Zn composite catalyst under the aforementioned operating conditions.

Figure 9:
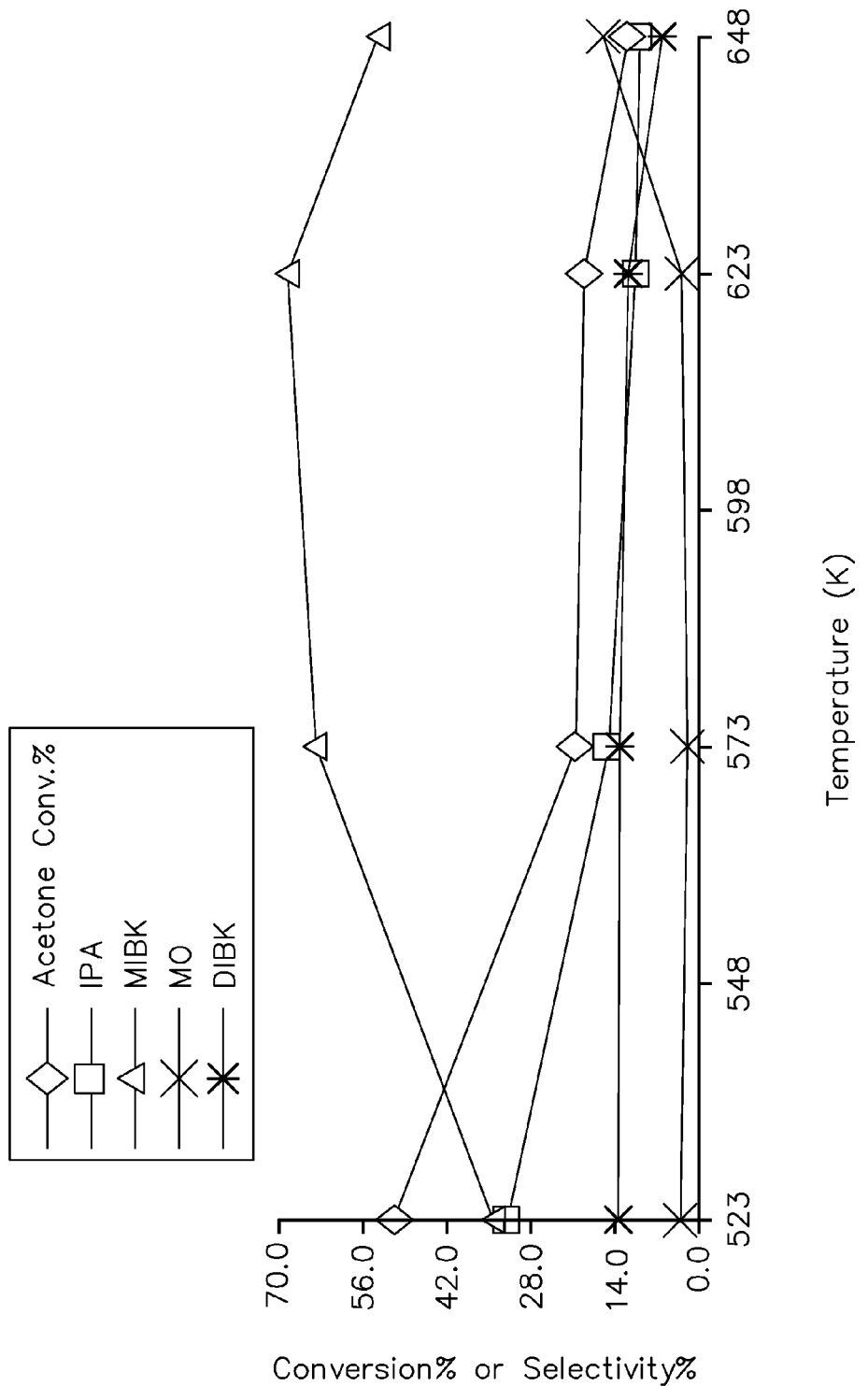
FIG. 9 Variation of DMK conversion % and product selectivity % with increasing the reaction temperature over 1Ru/1Zn composite catalyst (H$_2$=15 ml/min; DMK=0.015 ml/min; TOS=1 hr).

FIG. 9 exhibits the performance of the 1Ru/1Zn composite catalyst at $H_2$ flow rate of 15 ml/min and DMK flow rate of 0.015 ml/min. The DMK conversion % and IPA selectivity % decrease upon increasing the temperature while the MIBK selectivity % increases with increasing the temperature up to 623 K and decreases with increasing temperature at 648 K. The selectivity % towards DIBK and towards MO is almost stable with increasing temperature from 523 to 623 K. The selectivity % of DIBK decreases while the MO selectivity % increases with increasing temperature to 648 K. According to these observations, 648 K may be an undesirable temperature with regards to catalytic activity. 623 K may be optimal temperature for obtaining MIBK from the DMK-self condensation process among the tested embodiments, but not limited to the same. 523 K, with its highest DMK conversion %, may be considered as an optional temperature between DMK-self condensation and DMK-direct hydrogenation because both MIBK and IPA are produced with almost same selectivity.

Figure 10:
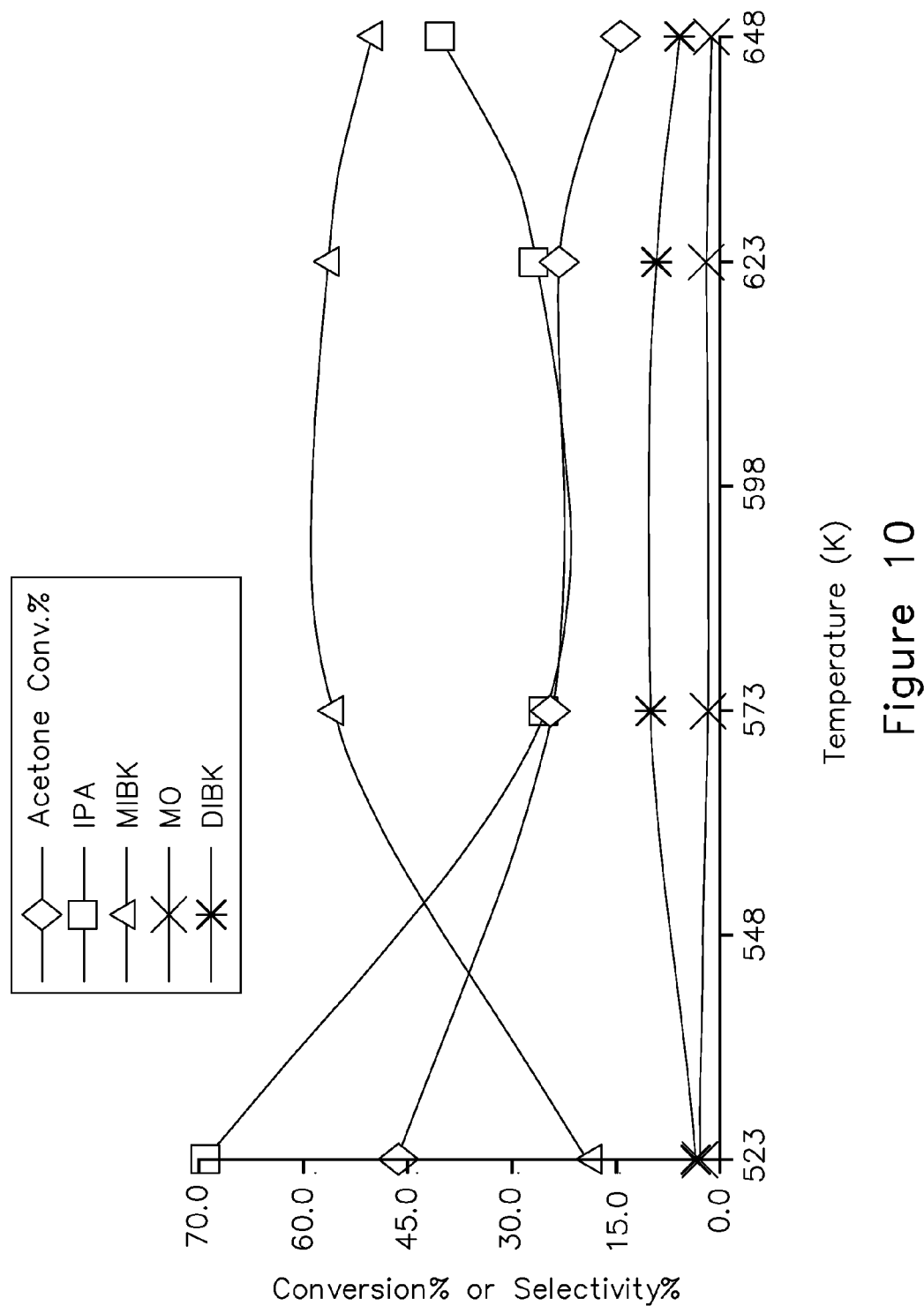
FIG. 10 Variation of DMK conversion % and product selectivity % with increasing the reaction temperature over 3Ru/2Zn composite catalyst (H$_2$=10 ml/min; DMK=0.01 ml/min; TOS=1 hr).

FIG. 10 shows the catalytic performance of the 3Ru/2Zn composite catalyst at $H_2$ flow rate of 10 ml/min and DMK flow rate of 0.01 ml/min. The DMK conversion % decreases with increasing temperature from 523 to 573 K, then becomes stable upon increasing temperature to 623 K, and finally decreases by increasing temperature to 648 K. The selectivity % towards IPA, however, decrease by increasing temperature from 523 to 573 K and then increases by increasing temperature to 623 K and 648 K. The selectivity % towards MIBK, varies with regards to the selectivity % towards IPA, increases with increasing the temperature from 523 to 573 and then decreases with increasing the temperature to 623 to 648 K. The selectivity % towards DIBK has a similar trend to that one observed for MIBK. The selectivity % towards MO is very low and decreases slightly with increasing temperature to 573 K and then stabilizes with increasing temperature. These trends in DMK conversion % and product selectivity % indicate that 573 K is the best temperature for DMK-self condensation towards MIBK and 523 K is the best temperature for DMK-direct hydrogenation towards IPA.

Figure 11:
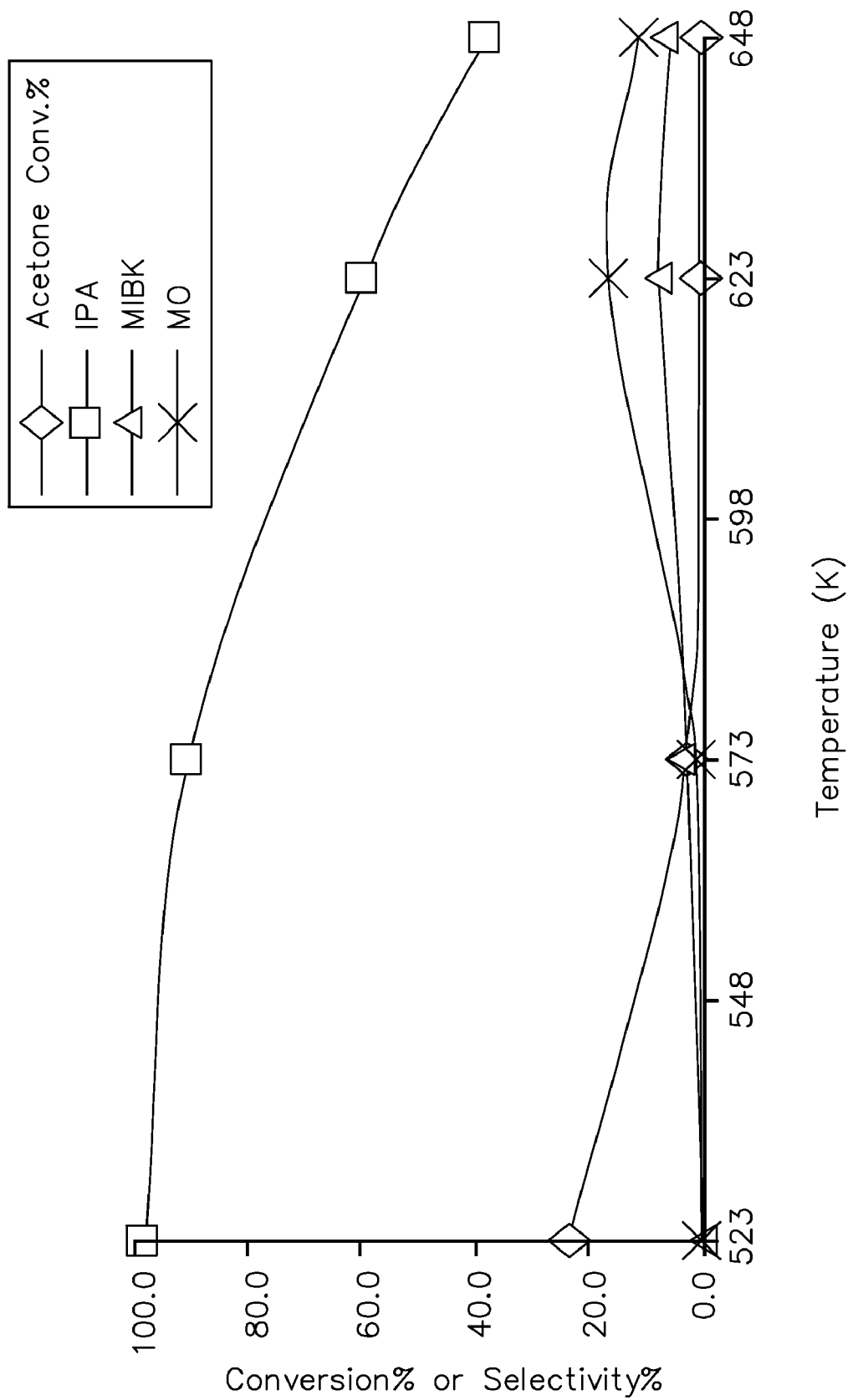
FIG. 11 Variation of DMK conversion % and product selectivity % with increasing the reaction temperature over 1Ru/0Zn composite catalyst (H$_2$=20 ml/min; DMK=0.02 ml/min; TOS=1 hr).

FIG. 11 shows the catalytic performance of the 1Ru/0Zn at $H_2$ flow rate of 20 ml/min and DMK flow rate of 0.02 ml/min. The DMK conversion % decreases dramatically to almost zero with increasing temperature. Catalytic behavior of using n-Ru/AC by itself as a catalyst appears to be ineffective. Furthermore, 1Ru/0Zn composite catalyst gives high selectivity % towards IPA because of the Ru metal potential for adsorbing hydrogen while very low selectivity % towards MO, MIBK and DIBK was observed due to the lack of the acidic-basic sites, required for the DMK-self condensation process. The selectivity towards IPA decreases enormously with increasing temperature because of the exothermic nature of the hydrogenation process of DMK to IPA ($\Delta H$=−54.4 kJ/mol (Wiberg et al., 1991), resulting in thermodynamic disfavoring of DMK-direct hydrogenation process.

Figure 12:
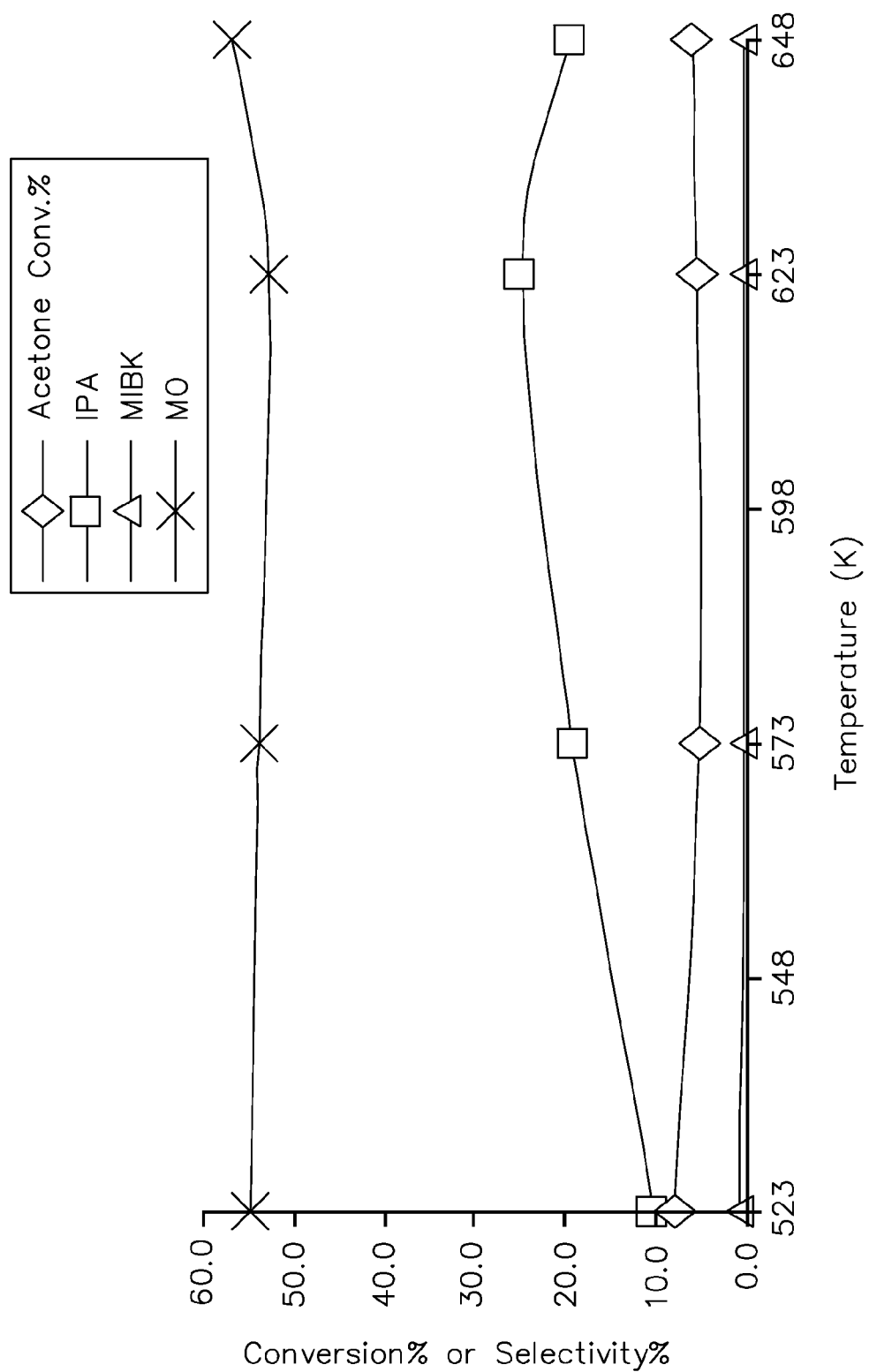
FIG. 12 Variation of DMK conversion % and product selectivity % with increasing the reaction temperature over 0Ru/1Zn composite catalyst (H$_2$=20 ml/min; DMK=0.02 ml/min; TOS=1 hr).

FIG. 12 shows the catalytic behavior over the 0Ru/1Zn composite catalyst at $H_2$ flow rate of 10 ml/min and DMK flow rate of 0.01 ml/min. The DMK conversion % is low, reflecting the poor catalytic activity of n-ZnO by itself as a composite catalyst, and is almost stable with increasing temperature. The highest selectivity towards MO is shown because n-ZnO possesses acidic-basic sites. On the other hand, the low selectivity % towards IPA reflects the ability of n-ZnO for the DMK-direct hydrogenation. The hydrogenation ability of n-ZnO might be ascribed to its reduction to zinc metal (Taylor et al., 1927, Burwell et al. 1936, Woodman et al. 1940, Taylor et al. 1946). The very poor selectivity % towards MIBK may denote to the very poor hydrogenation ability of Zn metal in n-ZnO to hydrogenate the C=C, which is conjugated with the carbonyl group of MO.

Figure 13:
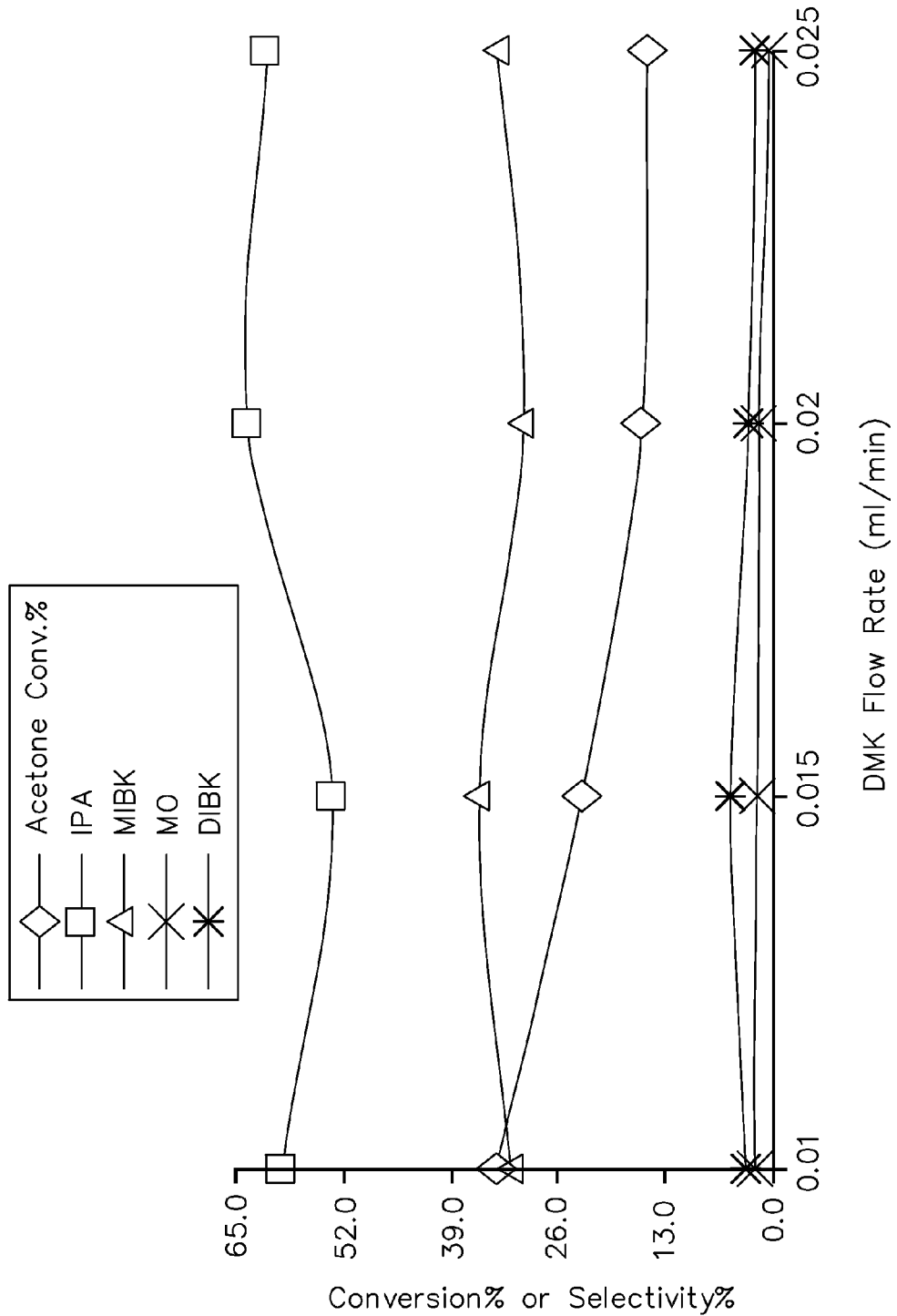
FIG. 13 Variation of DMK conversion % and product selectivity % with increasing the DMK flow rate over 1Ru/2Zn composite catalyst (T=523 K; H$_2$=10 ml/min; TOS=1 hr).

FIGS. 13-17 display the effect of DMK flow rate on the catalytic performance. FIG. 13 shows that the DMK conversion % decreases with increasing the DMK flow rate from 0.01 to 0.025 ml/min over the 1Ru/2Zn composite catalyst at 523 K and $H_2$ flow rate of 10 ml/min. On the other hand, the selectivity % towards IPA, MIBK, DIBK, and MO remains almost constant for each of them upon increasing the DMK flow rate. Such observations may indicate that the composite catalyst surface is saturated with the reacting DMK molecules upon increasing their flow rate. In addition, the favoring high selectivity % towards IPA, irrespective of the DMK flow rate, this may also indicate that there is a preference of the DMK-direct hydrogenation over the DMK-self condensation by this composite catalyst under the aforementioned conditions.

Figure 14:
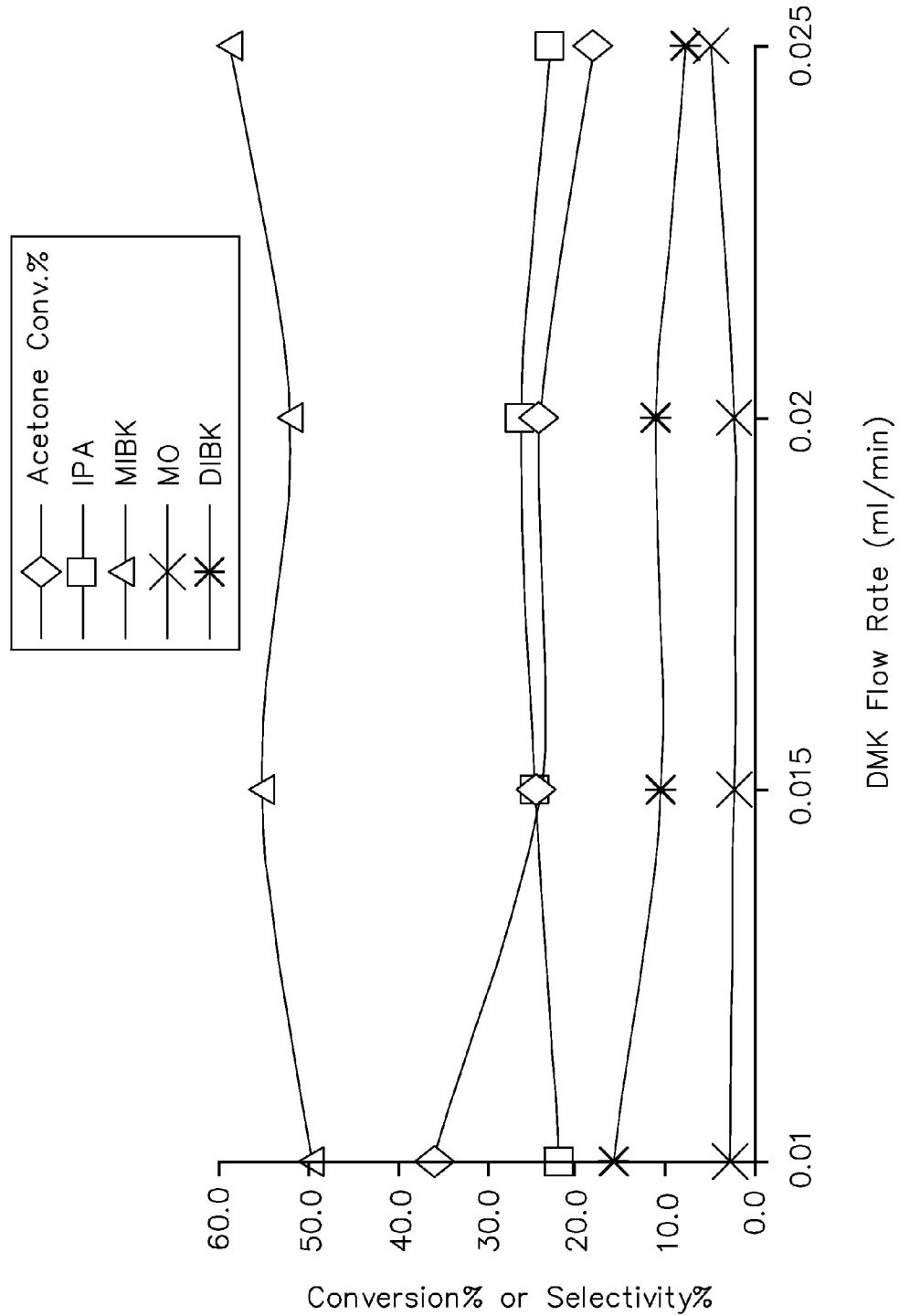
FIG. 14 Variation of DMK conversion % and product selectivity % with increasing the DMK flow rate over 1Ru/1Zn composite catalyst (T=523 K; H$_2$=5 ml/min; TOS=1 hr).

FIG. 14 exhibits the effect of increasing the DMK flow rate on its conversion % and on the product selectivity % over the 1Ru/1Zn composite catalyst at 523 K and $H_2$ flow rate of 5 ml/min. The DMK conversion % decreases with increasing the flow from 0.01 to 0.025 ml/min while the product selectivity % towards IPA, MIBK, DIBK, and MO remains almost stable for each of them upon increasing the DMK flow rate. These observations may point out that the saturation of the composite catalyst surface plays a role while reacting with DMK molecules when the flow rate is increased. The DMK self condensation appears to be favored over the DMK-direct hydrogenation under the experimental conditions by the composite catalyst by increasing the selectivity % towards MIBK regardless of DMK flow.

Figure 15:
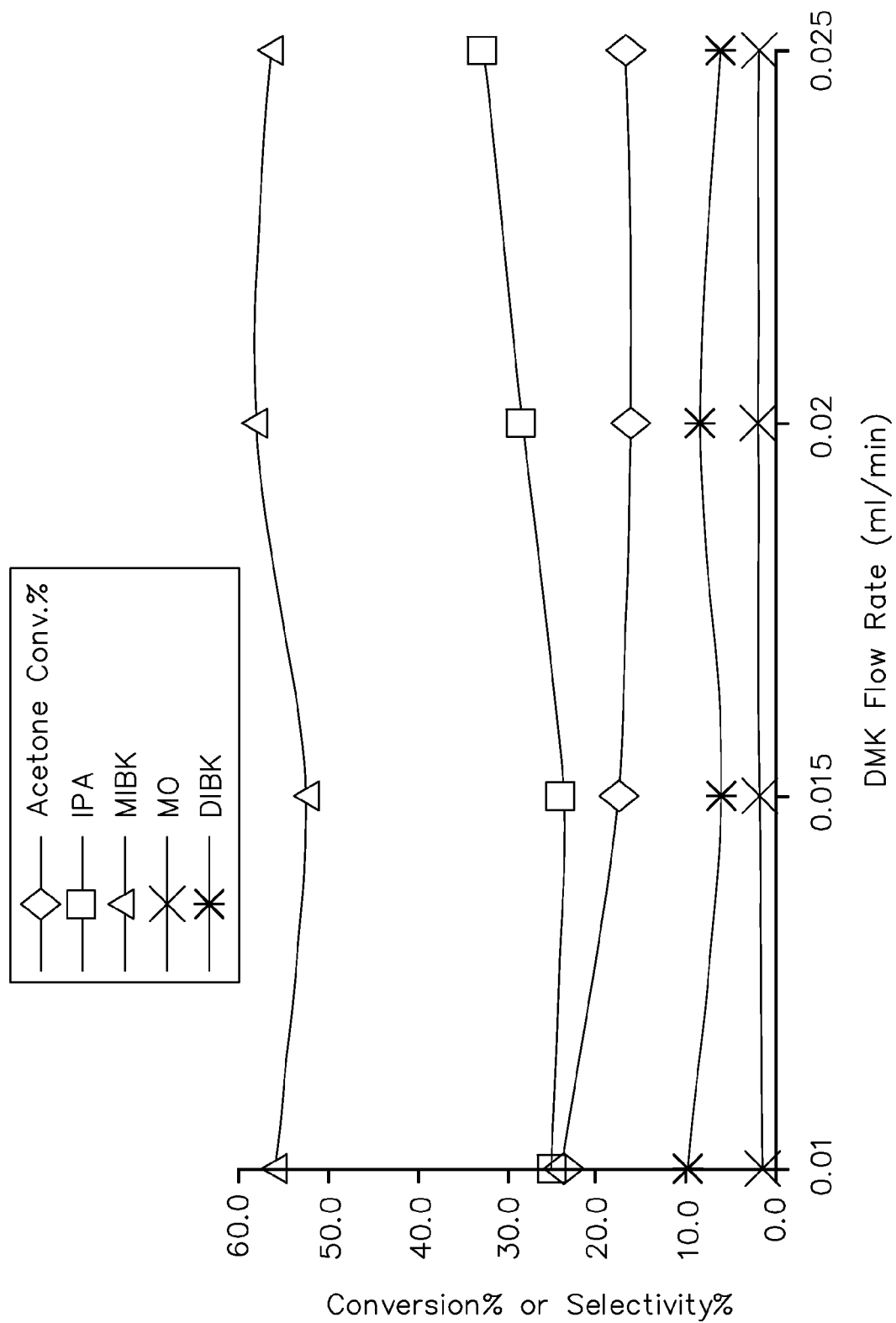
FIG. 15 Variation of DMK conversion % and product selectivity % with increasing the DMK flow rate over 3Ru/2Zn composite catalyst (T=573 K; H$_2$=10 ml/min; TOS=1 hr).

FIG. 15 represents the catalytic performance of the 3Ru/2Zn composite catalyst at 573 K and $H_2$ flow rate of 10 ml/min when the DMK flow rate is increased. The DMK conversion % decreases as a results of increasing its flow rate from 0.01 to 0.015 and then stabilizes with increasing the flow rate. The selectivity % towards IPA increases with increasing the DMK flow rate while the selectivity % towards MIBK, DIBK, and MO remains constant for each of them. The highest selectivity, however, is noticed towards MIBK. These results may indicate that the DMK-self condensation is favored over the DMK-direct hydrogenation when using this composite catalyst under the above mentioned reaction conditions.

Figure 16:
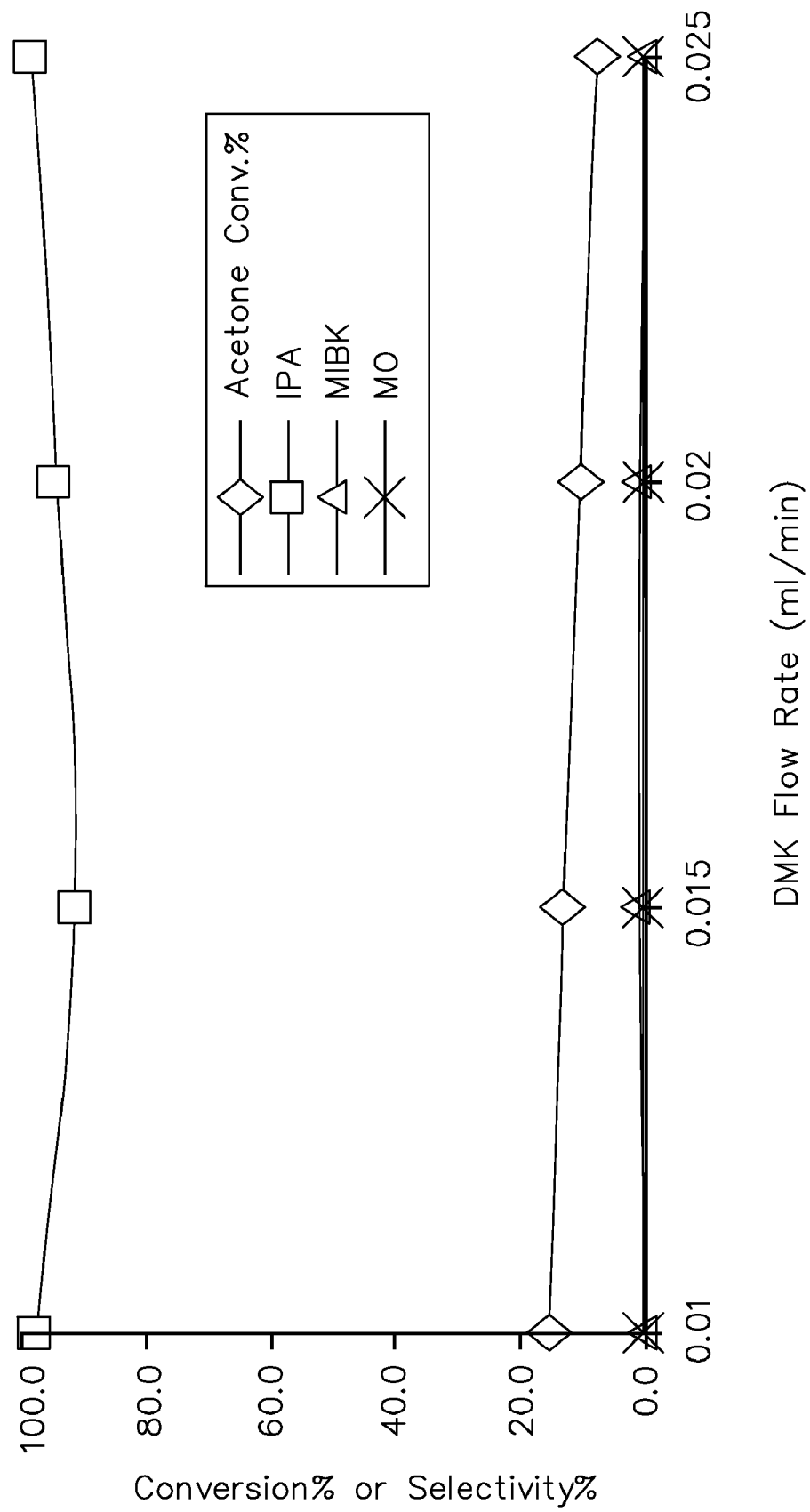
FIG. 16 Variation of DMK conversion % and product selectivity % with increasing the DMK flow rate over 1Ru/0Zn composite catalyst (T=523 K; H$_2$=15 ml/min; TOS=1 hr).

FIG. 16 shows low DMK conversion %, which decreases with increasing its flow rate from 0.01 to 0.025 ml/min over the 1Ru/0Zn composite catalyst at 523 K and $H_2$ flow rate of 15 ml/min. The selectivity % towards IPA is almost 100% over the whole range of the DMK flow rate investigated whereas the selectivity % towards other products (MIBK, DIBK, and MO) is negligible. These results may be indicative of the ruthenium power in adsorbing hydrogen, carrying out the hydrogenation reaction, and lacking the required acidic-basic sites for the DMK-self condensation. In addition, these results illustrate the poor catalytic activity of a single-component catalyst and prove the need of multifunctional-property of a composite catalyst, possessing the acidic-basic and hydrogenation sites.

Figure 17:
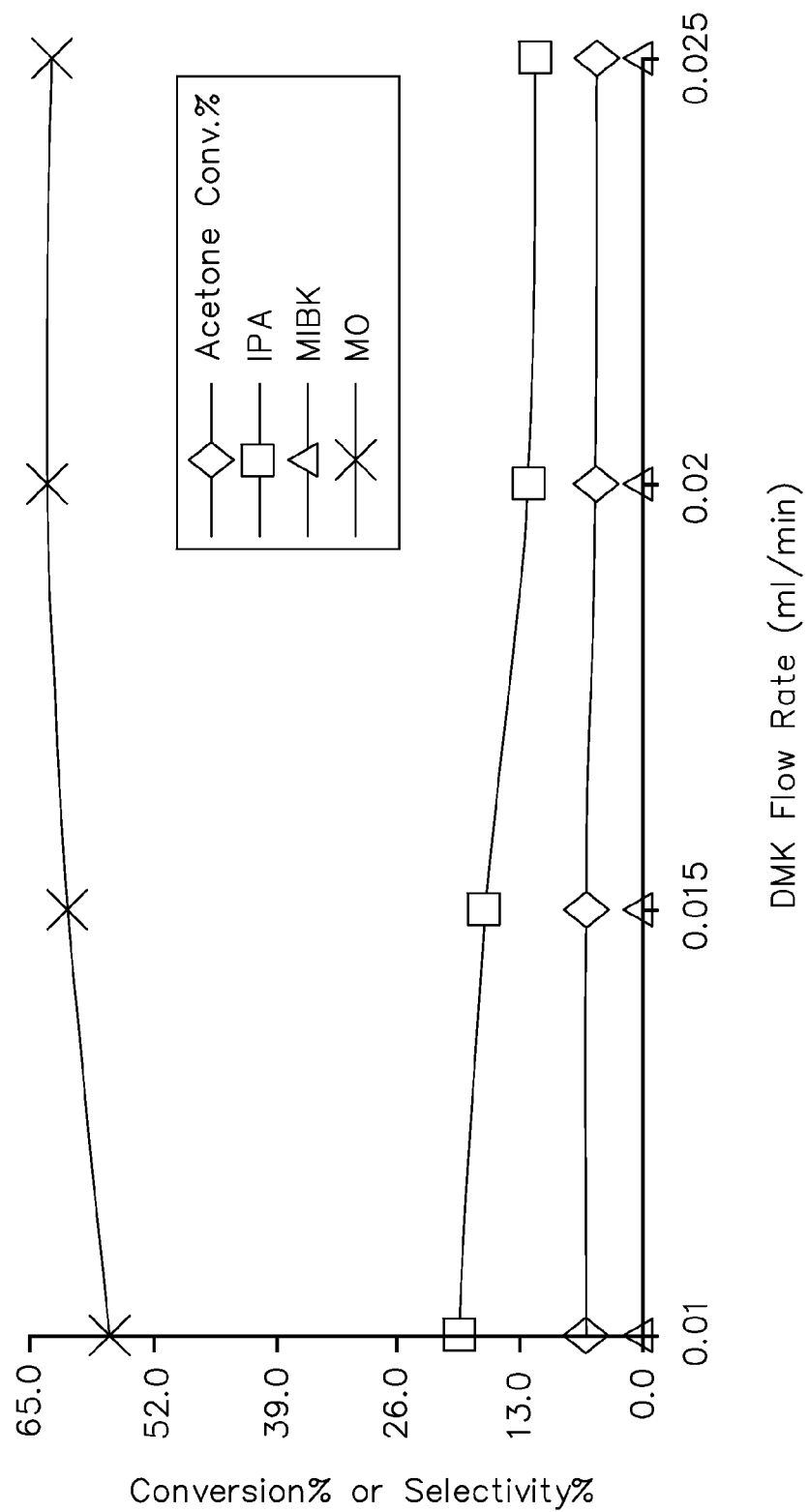
FIG. 17 Variation of DMK conversion % and product selectivity % with increasing the DMK flow rate over 0Ru/1Zn composite catalyst (T=648 K; H$_2$=15 ml/min; TOS=1 hr).

FIG. 17 displays the low catalytic activity of the 0Ru/1Zn composite catalyst, as it is demonstrated by the low DMK conversion %, at 648 K and $H_2$ flow rate of 10 ml/min. The DMK conversion % is almost stable with the increase in its flow rate. The selectivity %, however, towards IPA is low and decreases with increasing the flow rate while the selectivity % towards MO increases. There is negligible selectivity % towards MIBK under these reaction conditions. These results may show the poor activity of a single-component catalyst and the preference of DMK-self condensation over the DMK-direct hydrogenation by using n-ZnO catalyst. The low selectivity % towards IPA might be attributed to the reduction of n-ZnO to zinc metal, working as a hydrogenation sites (Taylor et al., 1927, Burwell et al. 1936, Woodman et al. 1940, Taylor et al. 1946). The highest selectivity towards MO may be due to n-ZnO acidity-basicity surface character. The neglected selectivity % towards MIBK may be taken as an evidence for the very poor hydrogenation ability of Zn metal in n-ZnO to hydrogenate the conjugated C=C with the carbonyl group in MO.

Figure 18:
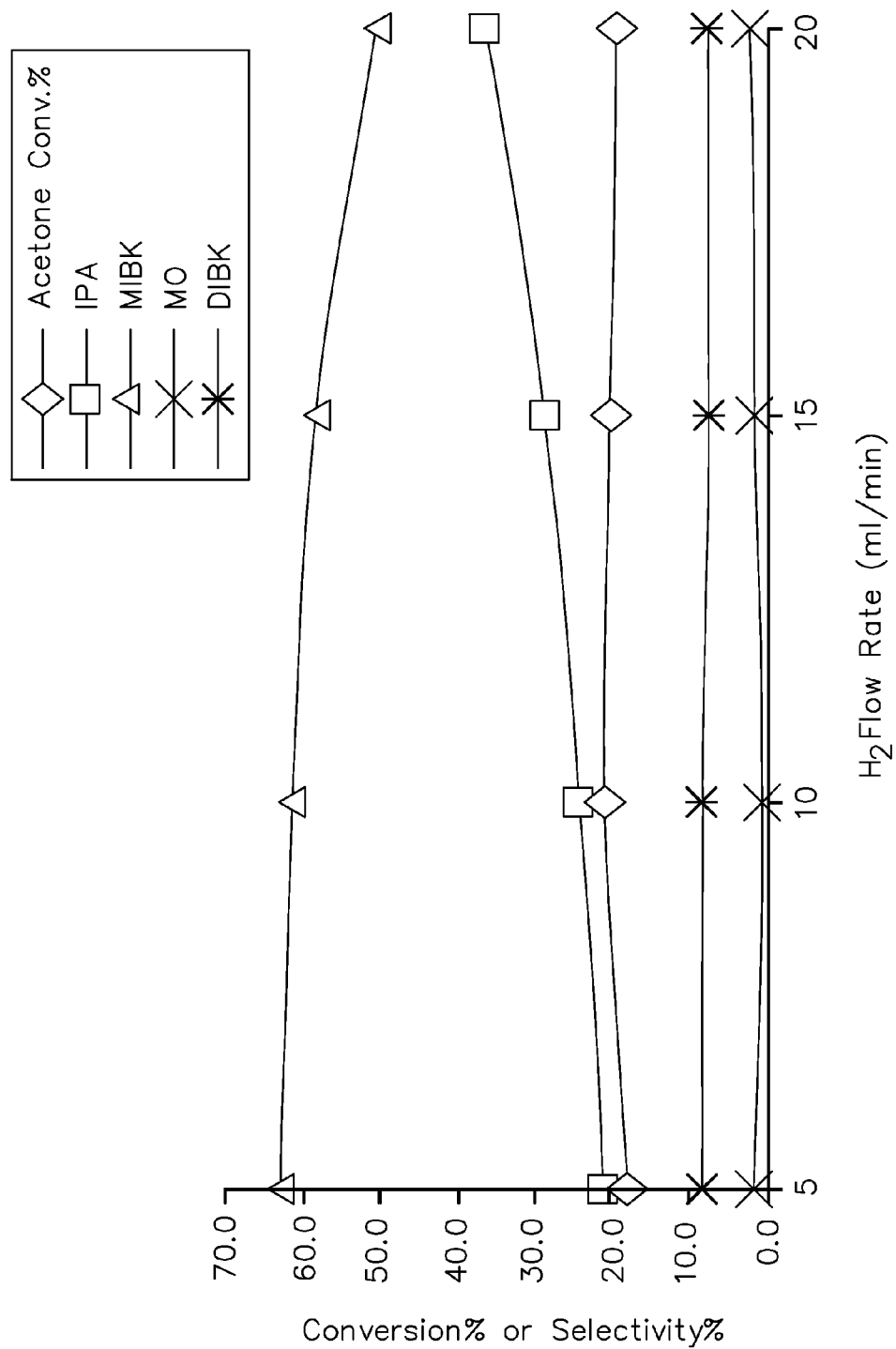
FIG. 18 Variation of DMK conversion % and product selectivity % with increasing the H$_2$ flow rate over 1Ru/2Zn composite catalyst (T=573 K; DMK=0.01 ml/min; TOS=1 hr).

FIGS. 18-22 represent examples for the effect of $H_2$ flow rate on the catalytic performance. FIG. 18 shows that the DMK conversion % and the selectivity % towards DIBK and towards MO are almost constant with increasing the $H_2$ flow rate from 5 to 20 ml/min over the 1Ru/2Zn composite catalyst at 573 K and DMK flow rate of 0.01 ml/min. However, the selectivity % towards IPA increases while the selectivity % towards MIBK decreases with increasing the $H_2$ flow rate. These observations generally display the preference of the DMK-self condensation over the DMK-direct hydrogenation by using this composite catalyst under these circumstances. However, the decrease in MIBK selectivity % and increase in IPA selectivity % along with increasing the $H_2$ flow rate may denote that the increase in $H_2$ flow rate facilitate the DMK-direct hydrogenation more than the DMK-self condensation.

Figure 19:
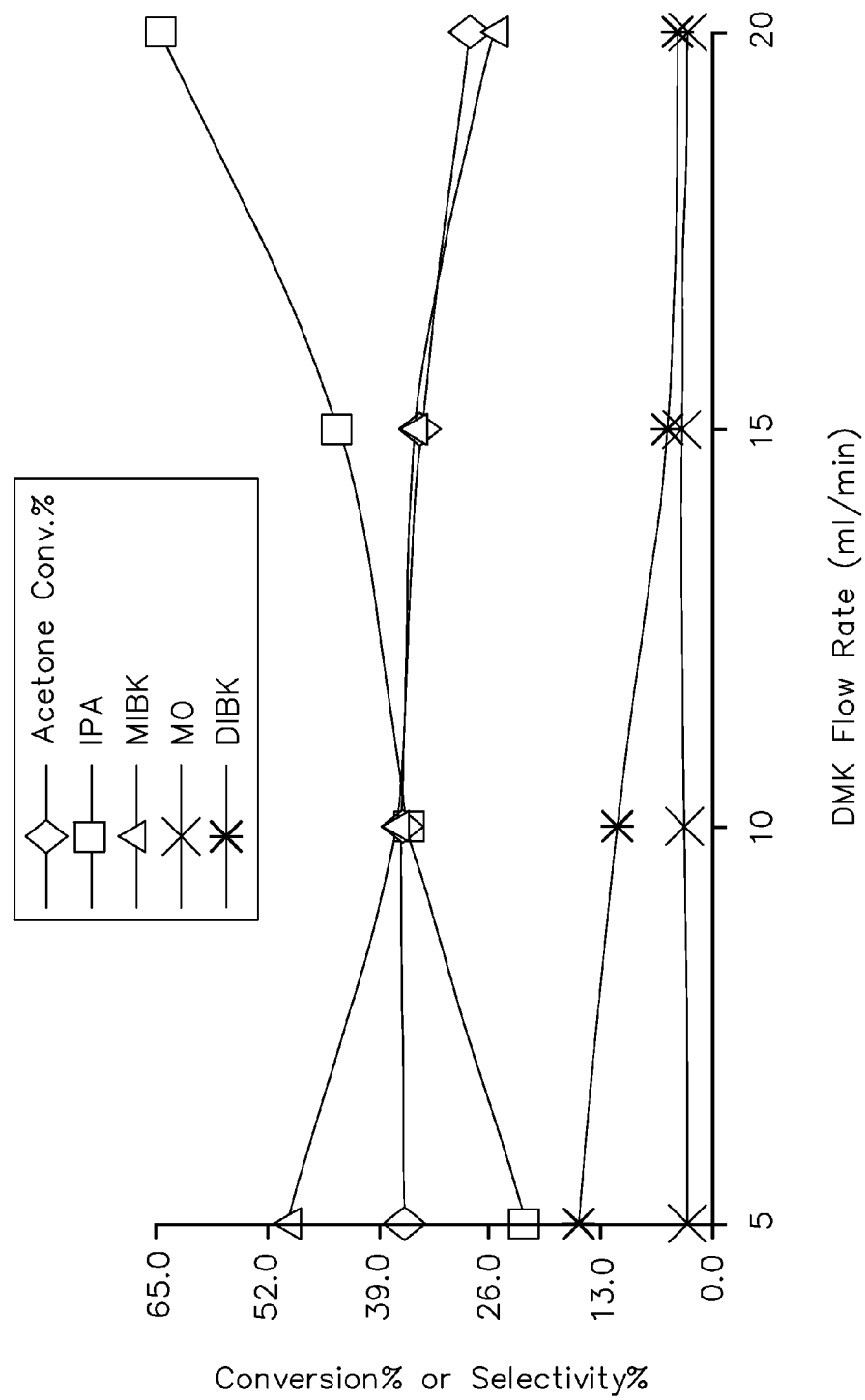
FIG. 19 Variation of DMK conversion % and product selectivity % with increasing the H$_2$ flow rate over 1Ru/1Zn composite catalyst (T=523 K; DMK=0.01 ml/min; TOS=1 hr).

FIG. 19 shows that the DMK conversion % decreases with increasing the $H_2$ flow rate from 5 to 20 ml/min over 1Ru/1Zn composite catalyst at 523 K and DMK flow rate of 0.01 ml/min. The selectivity % towards IPA, however, increases while the selectivity % towards MIBK and towards DIBK decreases upon increasing the $H_2$ flow rate. The selectivity % towards MO is almost constant over the studied range of $H_2$ flow rate. These results may suggest that the DMK-direct hydrogenation is preferred over the DMK-self condensation by using this composite catalyst under these operating conditions. The decrease in DMK conversion % upon the increase in the flow might be ascribed to the reduction in contact time, i.e. reduction in the residence of DMK molecules over the surface of the composite catalyst. At $H_2$ flow rate of 10 ml/min the DMK conversion % and the selectivity % towards IPA and towards MIBK are equal, which may indicate that the composite catalyst direct both the DMK-direct hydrogenation and DMK-self condensation without any preference.

Figure 20:
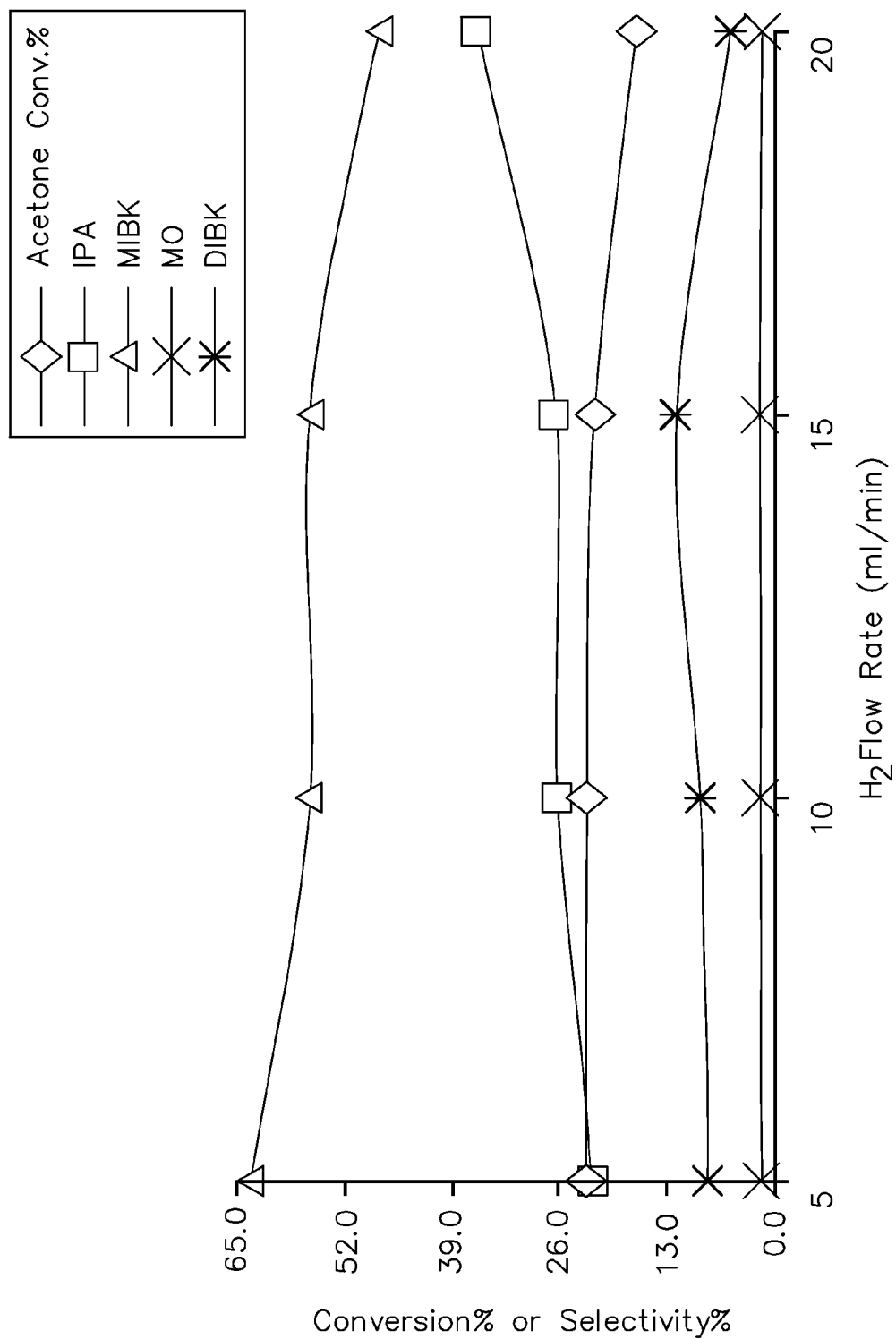
FIG. 20 Variation of DMK conversion % and product selectivity % with increasing the H$_2$ flow rate over 3Ru/2Zn composite catalyst (T=623 K; DMK=0.01 ml/min; TOS=1 hr).

FIG. 20 displays that the DMK conversion % is almost stable when increasing the $H_2$ flow rate from 5 to 15 ml/min and then decrease upon increasing the flow to 20 ml/min over 3Ru/2Zn composite catalyst at 623 K and DMK flow rate of 0.01 ml/min. On the other hand, the selectivity % towards IPA increases while the selectivity % towards MIBK decreases with increasing the $H_2$ flow rate. The selectivity % towards DIBK and towards MO is almost stable with increasing the flow. These results show the preference of the DMK-self condensation over the DMK-direct hydrogenation over this composite catalyst under these reaction conditions. However, the decrease in MIBK selectivity % and increase in IPA selectivity % may indicate that the DMK-direct hydrogenation preference increases with increasing the $H_2$ flow rate.

Figure 21:
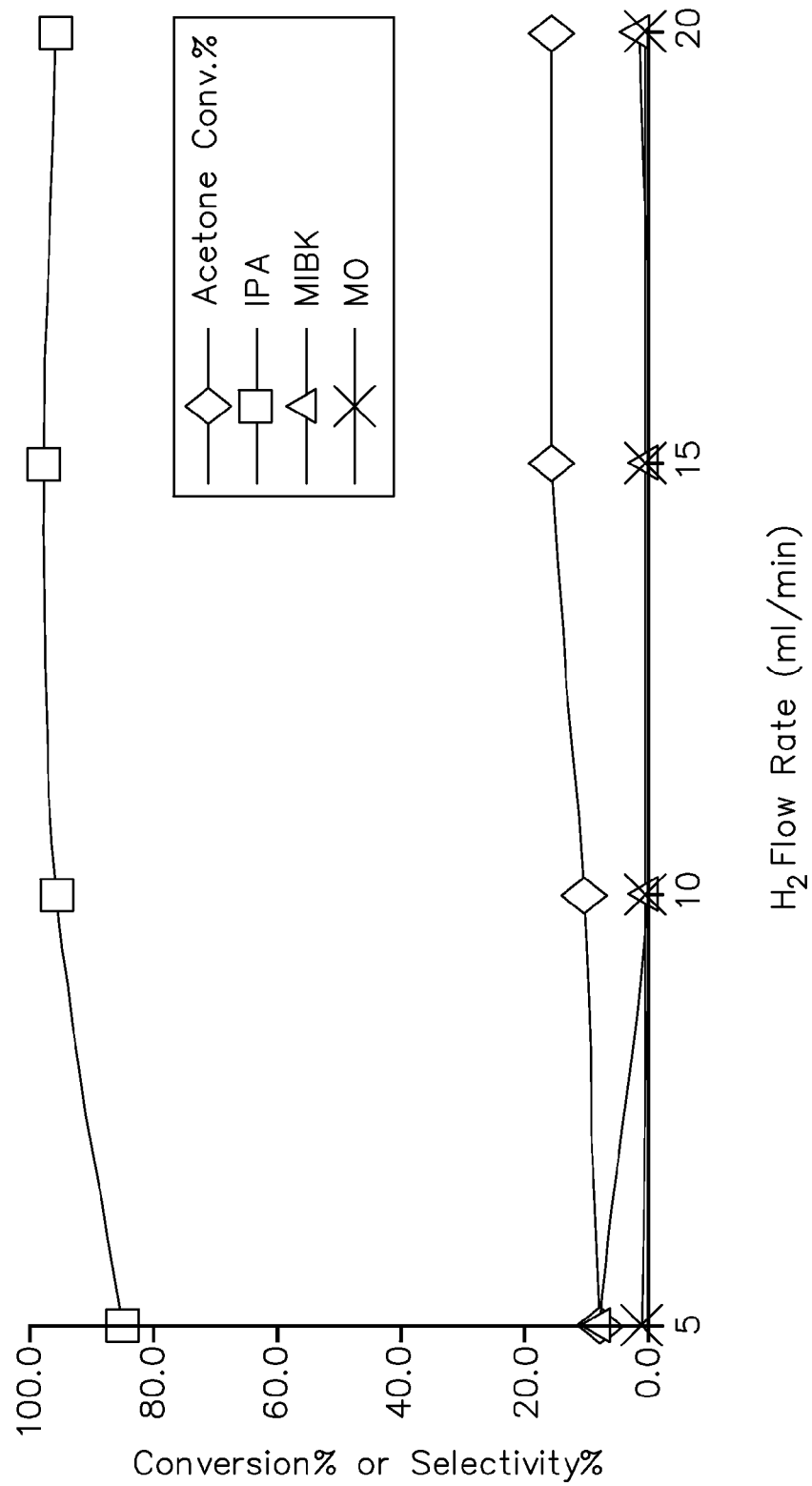
FIG. 21 Variation of DMK conversion % and product selectivity % with increasing the H$_2$ flow rate over 1Ru/0Zn composite catalyst (T=523 K; DMK=0.01 ml/min; TOS=1 hr).

FIG. 21 shows that both of DMK conversion % and selectivity % towards IPA increases with increasing the $H_2$ flow rate while the selectivity % towards MIBK decreases upon increasing the flow from 5 to 10 ml/min and then stabilizes over 1Ru/0Zn composite catalyst at 523 K and DMK flow rate of 0.01 ml/min. The selectivity % towards MO is negligible and stable along with the increase in flow. These results are consistent with the fact that the n-Ru/AC as a single-component composite catalyst has the power of hydrogenation, required for the DMK-direct hydrogenation, through its ruthenium metal and lacks the acidic-basic site, required for the DMK-self condensation. The low DMK conversion % displays the poor activity of the single-component composite catalyst.

Figure 22:
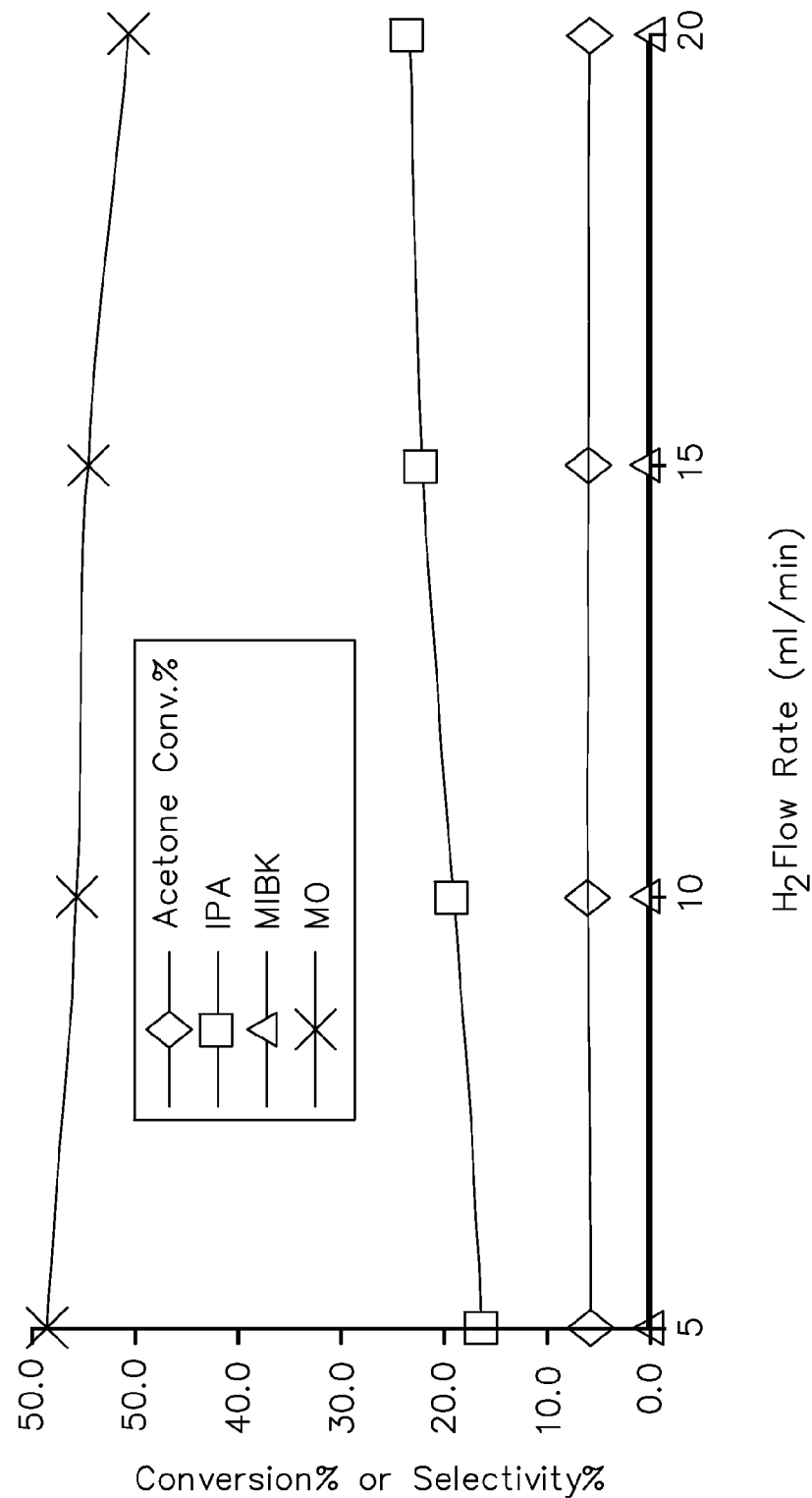
FIG. 22 Variation of DMK conversion % and product selectivity % with increasing the H$_2$ flow rate over 0Ru/1Zn composite catalyst (T=648 K; DMK=0.01 ml/min; TOS=1 hr).

FIG. 22 shows a low, stable DMK conversion % with increasing the $H_2$ flow rate over 0Ru/1Zn composite catalyst at 648 K and DMK flow rate of 0.01 ml/min. The selectivity % towards IPA increases whereas the selectivity % towards MO decreases with increasing the flow. The selectivity % towards MIBK is negligible, stable along with the increase in flow. These results are consistent with the poor hydrogenation power of n-ZnO catalyst due to the presence of zinc metal (Taylor et al., 1927, Burwell et al. 1936, Woodman et al. 1940, Taylor et al. 1946) and its preference for the DMK-self condensation over the DMK-direct hydrogenation. However, increases the $H_2$ flow increase the ability of the ZnO for the DMK-direct hydrogenation process, as it is evidence from increase in IPA selectivity % and decrease in MO selectivity %.

In addition, the specification and drawings are to be regarded in an illustrative rather than as in a restrictive sense.

What is claimed is:

1. A composite catalyst, comprising:
   a platinum group metal;
   an activated charcoal; and
   a nano-zinc oxide.

2. The composite catalyst as in claim 1, wherein the platinum group of metal is at least one of a ruthenium, rhodium, palladium, osmium, iridium, and platinum nanoparticle.

3. The composite catalyst as in claim 2, wherein the platinum group of metal is the ruthenium.

4. The composite catalyst as in claim 3, further comprising:
   a composite catalyst of the ruthenium nanoparticle and the activated charcoal with the nano-zinc oxide for one step gas phase acetone condensation.

5. A process of making a composite catalyst, comprising:
   adding zinc sulfate and sodium pyruvic acid oxime monohydrate as reactants in an aqueous solution;
   mixing the reactants to form a precipitate;
   filtering the precipitate and drying the precipitate in a vacuum overnight;
   heating the precipitate overnight to obtain a nano-ZnO; and
   ratio proportioning and pulverizing the nano-ZnO with a ruthenium nanoparticle-activated charcoal to make a composite catalyst.

6. The process of making the composite catalyst as in claim 5, wherein the composite catalyst is ruthenium nanoparticle-activated charcoal-nano-zinc oxide.

7. The process of making the composite catalyst as in claim 5, wherein the ratio proportioning is using a different weight ratio the ruthenium nanoparticle-activated charcoal and of the precipitate to make the composite catalyst.

8. The process of making the composite catalyst as in claim 6, wherein the weight ratio of the ruthenium nanoparticle-activated charcoal and the precipitated to make the composite catalyst is at least one of 1:0, 1:1, 1:2 and 3:2.

9. The process of making the composite catalyst as in claim 5, wherein the precipitate is Zinc(II) 2-oximinopropionate dehydrate.

10. The process of making the composite catalyst as in claim 5, further comprising:
    activating the composite catalyst under a specific temperature, a specific hydrogen flow rate and a specific time.

11. The process of making the composite catalyst as in claim 10, wherein the specific temperature is between 662 k and 673 k.

12. The process of making the composite catalyst as in claim 10, wherein the specific hydrogen flow rate of 50-60 ml/min.

13. The process of making the composite catalyst as in claim 10, wherein the specific time is overnight.

14. The process of making the composite catalyst as in claim 5, further comprising, varying the degree of dispersion of ruthenium and an acidic/basic site concentration ratio to make an optimized composite catalyst.

15. A method of using a composite catalyst, wherein said catalyst comprises a platinum group metal, an activated charcoal, and a nano-zinc oxide comprising:
    loading a composite catalyst in a reactor between two layers of pyrex glass wool and pieces of ceramic;
    placing a thermocouple in the center of the composite catalyst to monitor a reaction temperature;
    vaporizing acetone using a heated tube and a pump at a specific rate and a specific temperature;
    introducing the vaporized acetone as a continuous flow at a specific flow rate to mix with a hydrogen gas at a continuous flow rate; and
    reacting the vaporized acetone mixed with hydrogen gas with the composite catalyst to produce at least one of methyl isobutyl ketone, diisobutyl ketone, mesityl oxide, mesitylene, and isopropyl alcohol.

16. The method of using the composite catalyst as in claim 15, further comprising:
    collecting a liquid product that was formed and analyzing the liquid product every hour using a gas chromatography equipment; and
    analyzing a gas product using a gas analyzer to identify and quantify the gas product.

17. The method of using the composite catalyst as in claim 16, wherein the liquid product is at least one of methyl isobutyl ketone, and isopropyl alcohol.

18. The method of using the composite catalyst as in claim 15, wherein the reaction temperature is in the range of 523 k-648 k.

19. The method of using the composite catalyst as in claim 15, wherein the acetone flow rate is at least one of a 0.01, 0.015, 0.02 and 0.025 ml/min.

20. The method of using the composite catalyst as in claim 15, wherein the hydrogen flow rate is at least one of 5.0, 10.0, 15.0, and 20.0 ml/min.

* * * * *